US010179699B1

United States Patent
Roper et al.

(10) Patent No.: US 10,179,699 B1
(45) Date of Patent: Jan. 15, 2019

(54) PROCESS FOR SELECTING AN ORDER IN AN ITEM-ON-DEMAND ORDER SELECTION SYSTEM

(71) Applicant: ROSCH Logistical Technologies, LlC, Topton, PA (US)

(72) Inventors: Craig Roper, Mertztown, PA (US); William Schneider, LaFayette, NY (US)

(73) Assignee: ROSCH Logistical Technologies, LLC, Topton, PA (US)

( * ) Notice: Subject to any disclaimer, the term of this patent is extended or adjusted under 35 U.S.C. 154(b) by 0 days.

(21) Appl. No.: 15/904,037

(22) Filed: Feb. 23, 2018

Related U.S. Application Data

(63) Continuation-in-part of application No. 15/782,170, filed on Oct. 12, 2017.

(60) Provisional application No. 62/409,584, filed on Oct. 18, 2016.

(51) Int. Cl.
G06F 7/00 (2006.01)
B65G 1/137 (2006.01)
G06Q 50/28 (2012.01)

(52) U.S. Cl.
CPC ......... B65G 1/1371 (2013.01); B65G 1/1376 (2013.01); G06Q 50/28 (2013.01); B65G 2203/0216 (2013.01); B65G 2203/044 (2013.01)

(58) Field of Classification Search
None
See application file for complete search history.

(56) References Cited

U.S. PATENT DOCUMENTS

| | | | |
|---|---|---|---|
| 3,785,510 A * | 1/1974 | Grooteboer | B65G 47/49 198/349.9 |
| 5,159,781 A | 11/1992 | Glossop, Jr. et al. | |
| 5,272,321 A | 12/1993 | Otsuka et al. | |
| 5,407,055 A * | 4/1995 | Tanaka | B65G 17/36 198/429 |
| 6,950,722 B2 | 9/2005 | Mountz | |
| 7,044,463 B2 | 5/2006 | Brotherston et al. | |
| 8,730,529 B2 | 5/2014 | Link et al. | |
| 8,788,091 B2 | 7/2014 | Bauer | |
| 9,000,885 B2 | 4/2015 | Amran | |
| 2004/0133705 A1 | 7/2004 | Broussard et al. | |
| 2004/0222300 A1 | 11/2004 | Strickland | |
| 2012/0019841 A1 | 1/2012 | Schaertel et al. | |
| 2017/0050332 A1* | 2/2017 | Bauer | B26D 7/32 |

FOREIGN PATENT DOCUMENTS

WO 00065526 A1 11/2000

* cited by examiner

*Primary Examiner* — Yolanda R Cumbess
(74) *Attorney, Agent, or Firm* — Brown & Michaels, PC

(57) ABSTRACT

An order selection process is provided for the selecting of a plurality of a predetermined item or items from a stocked picking location in an order selection system.

10 Claims, 15 Drawing Sheets

Fig. 1

| 101 | Modification of form fields to optically readable font by user |
| 102 | Order for selection received into system |
| 103 | Order selection form (pick ticket) printed |
| 104 | Operator feeds order form into sheetfeed optical scanner assembly |
| 105 | Initiate button is pressed |
| 106 | Friction drive roller cycles form to scan area |
| 107 | Sheetfeed optical scanner assembly reads quantity and location |
| 108 | Scanner sends information to master plc |
| 109 | Master plc reacts to scanner input and executes program |
| 110 | Master plc program |
| 110a | Stops friction drive roller for duration of discharge/s |
| 110b | Sends communication to slave plc control panel |
| 111 | Slave plc reacts to communication from master plc |
| 112 | Slave plc program |
| 112a | Slave plc sends trigger signal to appropriate discharge conveyor |
| 113 | Slave plc complete |
| 113a | Item or items are discharged from discharge conveyor |
| 114 | Discharge motors are stopped by signal switch |
| 115 | Master plc applies power to friction drive roller for next scan |
| 115a | Master plc repeats scan cycle |
| 116 | Item or items are conveyed to appropriate packing zone |
| 116a | Item or items arrive in appropriate packing zone |
| 116b | If complete order, packed and shipped |
| 116c | If not complete, convey to next zone/s for completion |

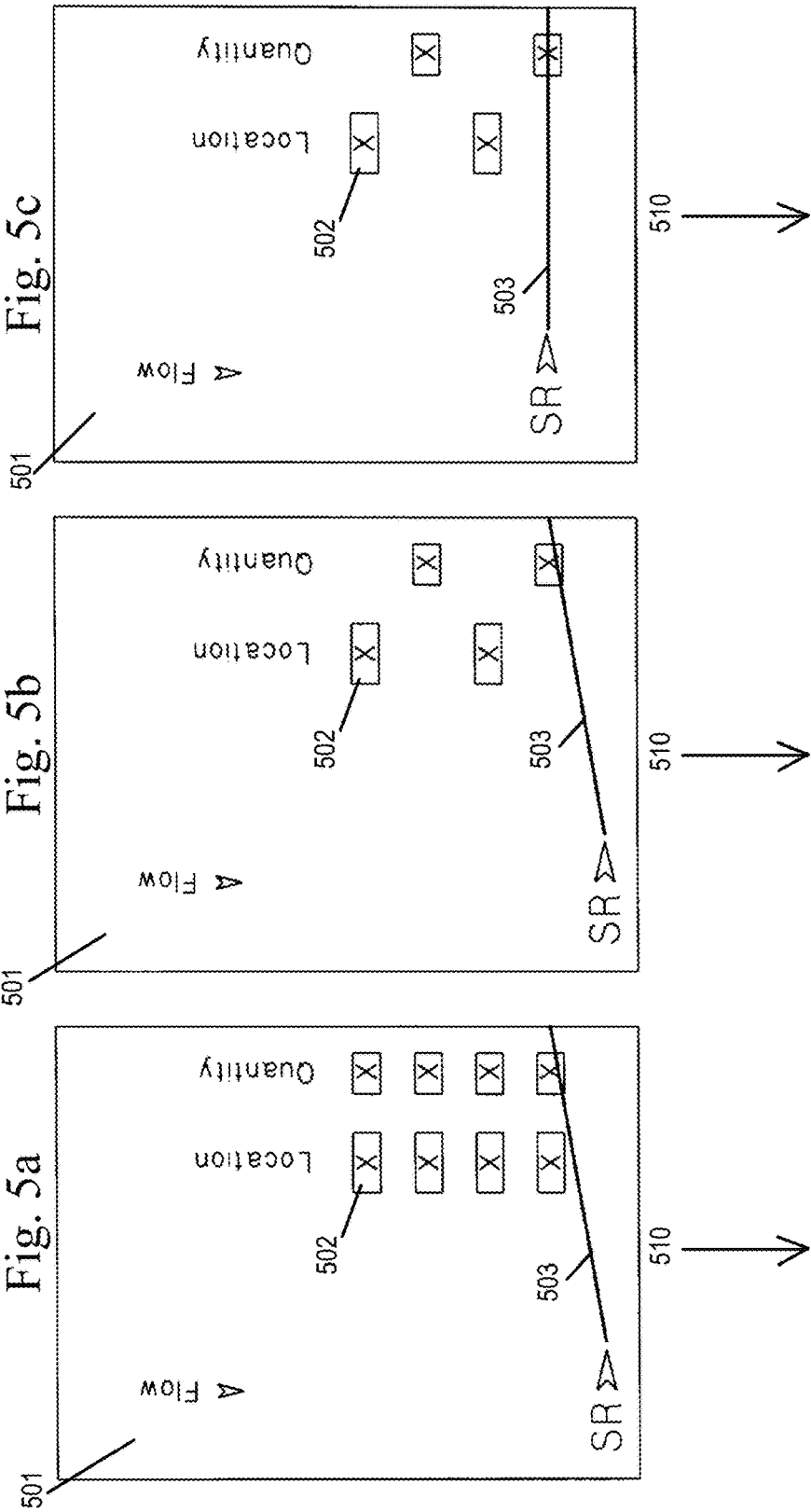

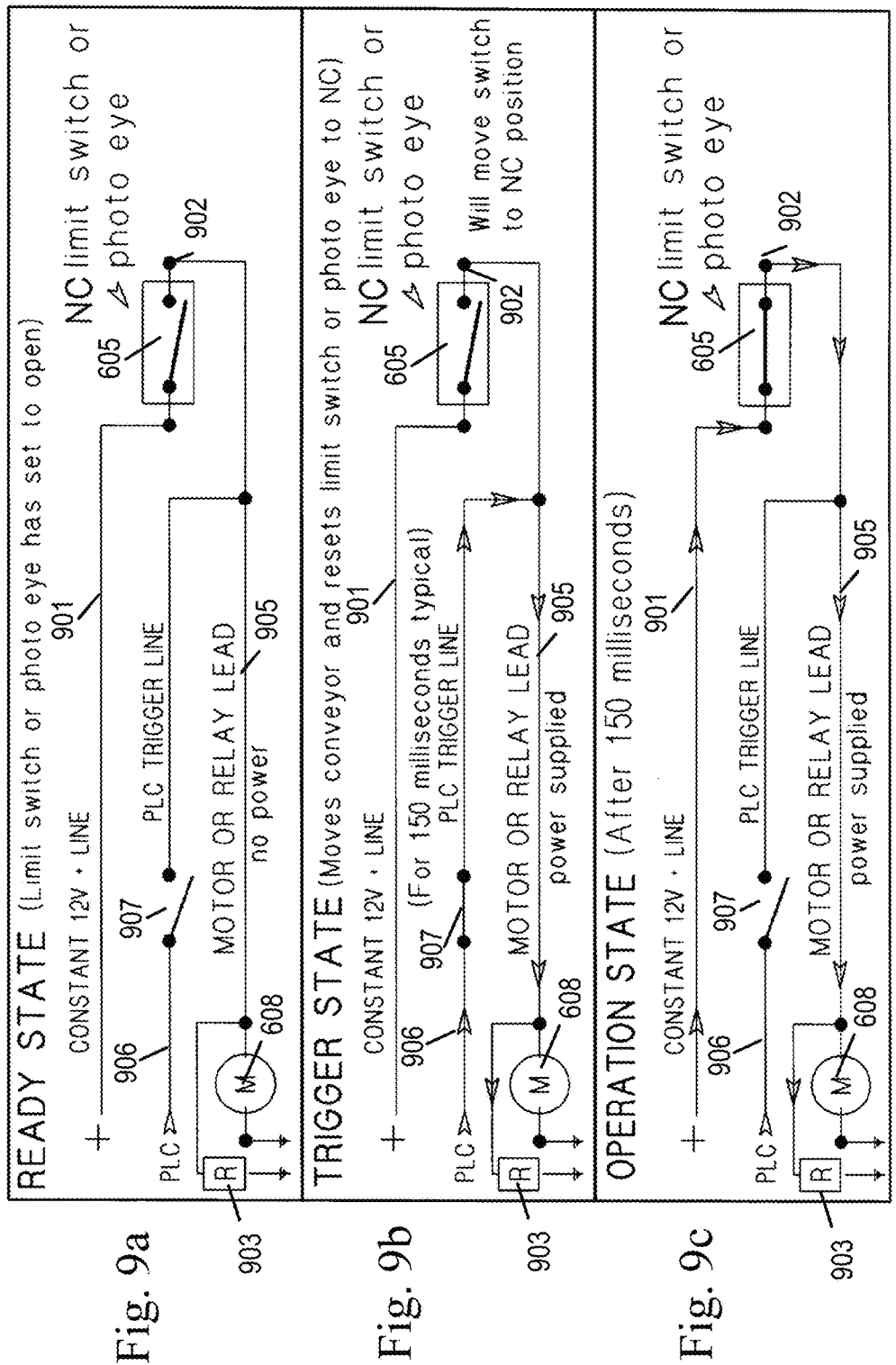

Fig. 10

| | |
|---|---|
| 2101 | Modification of form fields to optically readable font by user |
| 2102 | Order for selection received into system |
| 2103 | Tote or recepacle readied for conveyor introduction |
| 2104 | Order selection form (pick ticket) printed or label applied (auto) |
| 2105 | Order selection form introduced manually to holder on tote |
| 2106 | Tote with order information introduced to conveyor |
| 2107 | Coneyor scanner kicks tote to appropriate selection zone |
| 2108 | Zone switch reads available tote and beings order scan |
| 2109 | Linear scanner drive motor intiates and begins scanning |
| 2110 | Scanner sends information to master plc |
| 2111 | Master plc reacts to scanner input and executes program |
| 2112 | Master plc program |
| 2112a | Sends communication to slave plc control panel |
| 2112b | Sends start signal to high speed fill line for expected duration |
| 2113 | Slave plc reacts to communication from master plc |
| 2114 | Slave plc program |
| 2114a | Slave plc program sends trigger signal to appropriate discharge conveyor |
| 2115 | Slave plc program complete |
| 2115a | Item or items are discharged from discharge conveyors |
| 2116 | Discharge motors are stopped by signal switch |
| 2117 | Scanner repeats scan cycle if required |
| 2118 | Linear scanner reads end of order for zone |
| 2119 | Linear scanner recycles to origin position for next tote |
| 2119a | Tote is kicked back to main line for next zone selection |
| 2120 | All zones selected, tote on main conveyor line to pack/ship |

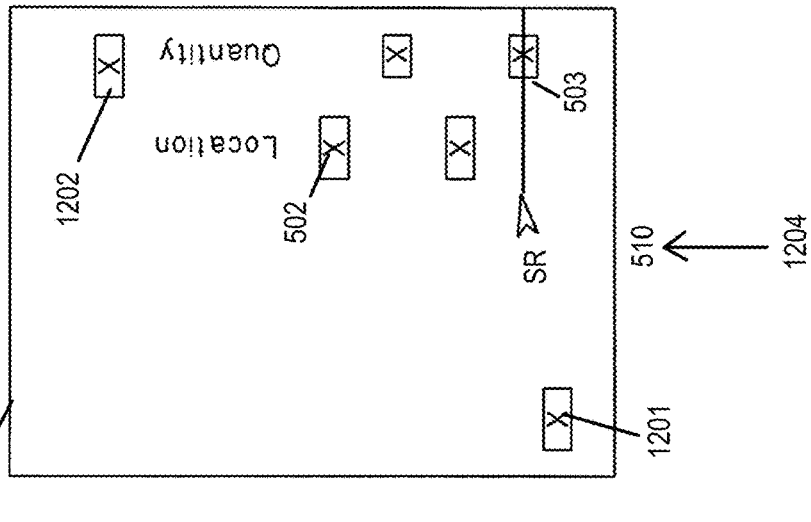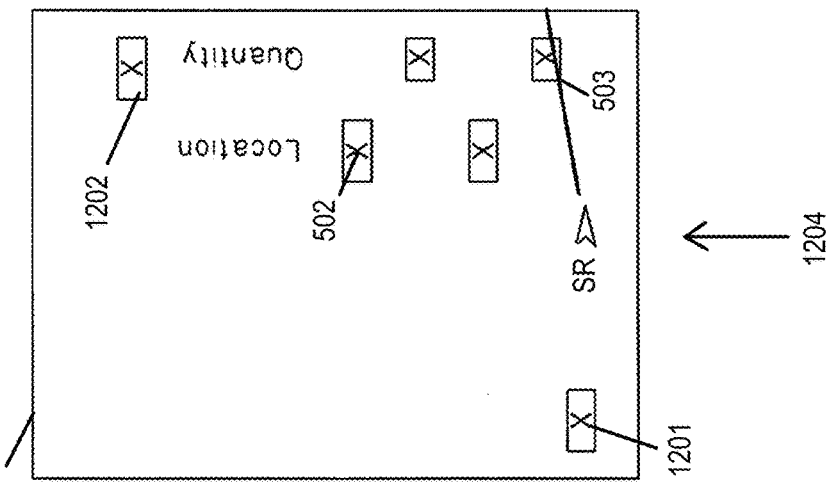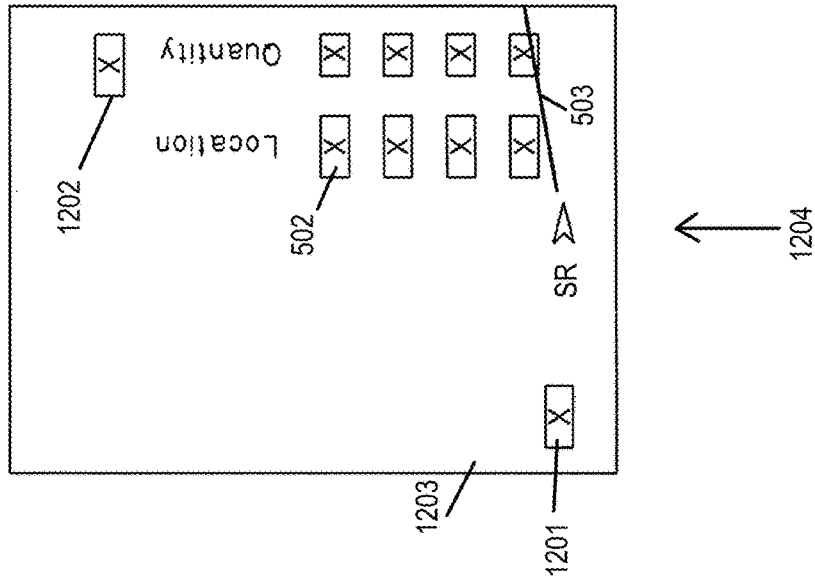

PROCESS FOR SELECTING AN ORDER IN AN ITEM-ON-DEMAND ORDER SELECTION SYSTEM

REFERENCE TO RELATED APPLICATIONS

This is a continuation-in-part patent application of copending application Ser. No. 15/782,170, filed Oct. 12, 2017, entitled "PROCESS FOR SELECTING AN ORDER IN AN ITEM-ON-DEMAND ORDER SELECTION SYSTEM", which claimed benefit under 35 USC § 119(e) of U.S. provisional application No. 62/409,584, filed Oct. 18, 2016, entitled "PROCESS FOR SELECTING AN ORDER IN AN ITEM-ON-DEMAND ORDER SELECTION SYSTEM". The aforementioned application(s) are hereby incorporated herein by reference.

BACKGROUND OF THE INVENTION

Field of the Invention

The invention in general relates to material handling systems in the warehousing and distribution industry and more specifically to the selection of items from a stocked location for conveyance to a packing area for order fulfillment. The invention also relates in general to the field of automatic order selection (goods to person) material handling systems and more specifically to the use of optical recognition scanning as a prime mover in the system.

Description of Related Art

Order selection is the procedure of selecting an item or items typically, but not limited to, less than case lot quantities from a prepared list also known as a "pick ticket" or "order selection form". These items reside in a main warehouse or distribution center in stocked locations and are selected for transfer to an external wholesale supplier, retail end user, or to a retail outlet for further point of sale distribution.

A number of systems and methods are currently employed by distributors and order selectors to achieve the result of goods or items requested by a purchaser to be selected and brought to a packing area for preparation to ship. This includes order selection from a printed paper order selection form (pick ticket) with human labor performing the physical task of locating, selecting, and movement of the item or items (goods) to a packing area for preparation of shipment. This also includes the use of integrated warehouse management software to select items through the use of electromechanical discharging apparatus, automatic sortation systems for routing to destination, and the use of programmed robotic equipment to replace human labor.

In almost all systems and methods, an order selection form (pick ticket) may be printed for use in quality assurance, order selection, and customer shipment information, if required.

Economy of labor and energy consumption to perform the tasks of order selection is an obvious factor of profitability. Increases in speed of order selection are desirable for the distributor/selector to be able to process more goods or items through an existing facility in a shorter amount of time, thereby increasing profitability.

Current and prior art does not sufficiently address the difficulties in an uncomplicated or cost efficient manner.

The most fundamental difficulties are as follows:
1. Speed of order selection for availability to the packing area.
2. Item-on-demand or goods to person systems that are not conducive to a wide variety or sizes of items to be selected by an order selection process.
3. Item-on-demand or goods to person systems that are not energy efficient.
4. Item-on-demand or goods to person systems that require an overabundance of physical space to reach an acceptable level of performance
5. Item-on-demand or goods to person systems that are difficult to implement due to major software integrations and the costs associated with these integrations.

SUMMARY OF THE INVENTION

In summary, specifically addressing the difficulties mentioned previously, the invention disclosed in this application is as follows: The use of PLC controlled discharge conveyors utilizing a specifically designed Self Controlled Sheetfeed Optical Recognition Scanner as a prime mover discharges an item or items for conveyance to a packing area at a very high rate of speed resulting in an increase of productivity compared to most conventional methods and current art.

A wide variety of items of different sizes and weights may be processed with this system. Physical detection of an individual item on conveyance is basically the main requirement for usage in this system.

This Item-on-Demand (I.O.D.) system utilizes a start/stop/wait approach to order selection which efficiently keeps the electrical power consumption down to a minimal amount based on the item or items demanded while maintaining a very high rate of order selection speed. The use of modular cubicals containing small parts discharge conveyors and high density arrangements for package, tote, pallet and other conveyors utilizes cubic space availability to a very high degree, utilizing the discharge conveyors as a means of storage.

The rear loading feature of all discharge conveyors, both modular and compacted, reduce the amount of forklift aisles and overall restock/order selection aisles. This also results in a first in/first out discharge of items.

The invention disclosed in this application may be utilized as an adaptive method for warehouse management systems, or order selection software by simply changing the font in the form fields of quantity and location to a barcode font or OCR font and utilizing a specifically designed Self Controlled Sheetfeed Optical Recognition Scanner as a prime mover to initiate the order selection process. This eliminates the need for major software integration changes and/or proprietary software systems for item-on-demand systems. It may operate as a standalone system or may be integrated into other systems for informational purposes.

BRIEF DESCRIPTION OF THE DRAWING

FIG. 1 shows a flowchart of system components and activity.

FIGS. 5a-5c show examples of a linear read by a self controlled sheetfeed optical scanner.

FIGS. 9a-9c show a schematic representation of a trigger method for discharge conveyors.

FIG. 10 shows a flowchart of an alternate embodiment of system components and activity.

FIGS. 12a-12c show an alternate embodiment of a linear read of an order form by a self-controlled optical scanner.

DETAILED DESCRIPTION OF THE INVENTION

The I.O.D. (Item-on-Demand) system as described herein and shown in diagram form in FIG. 3 is very basically an adaptive process that may be utilized with existing warehouse management systems that produce an order selection form (pick ticket) in printed form.

Figure 3:
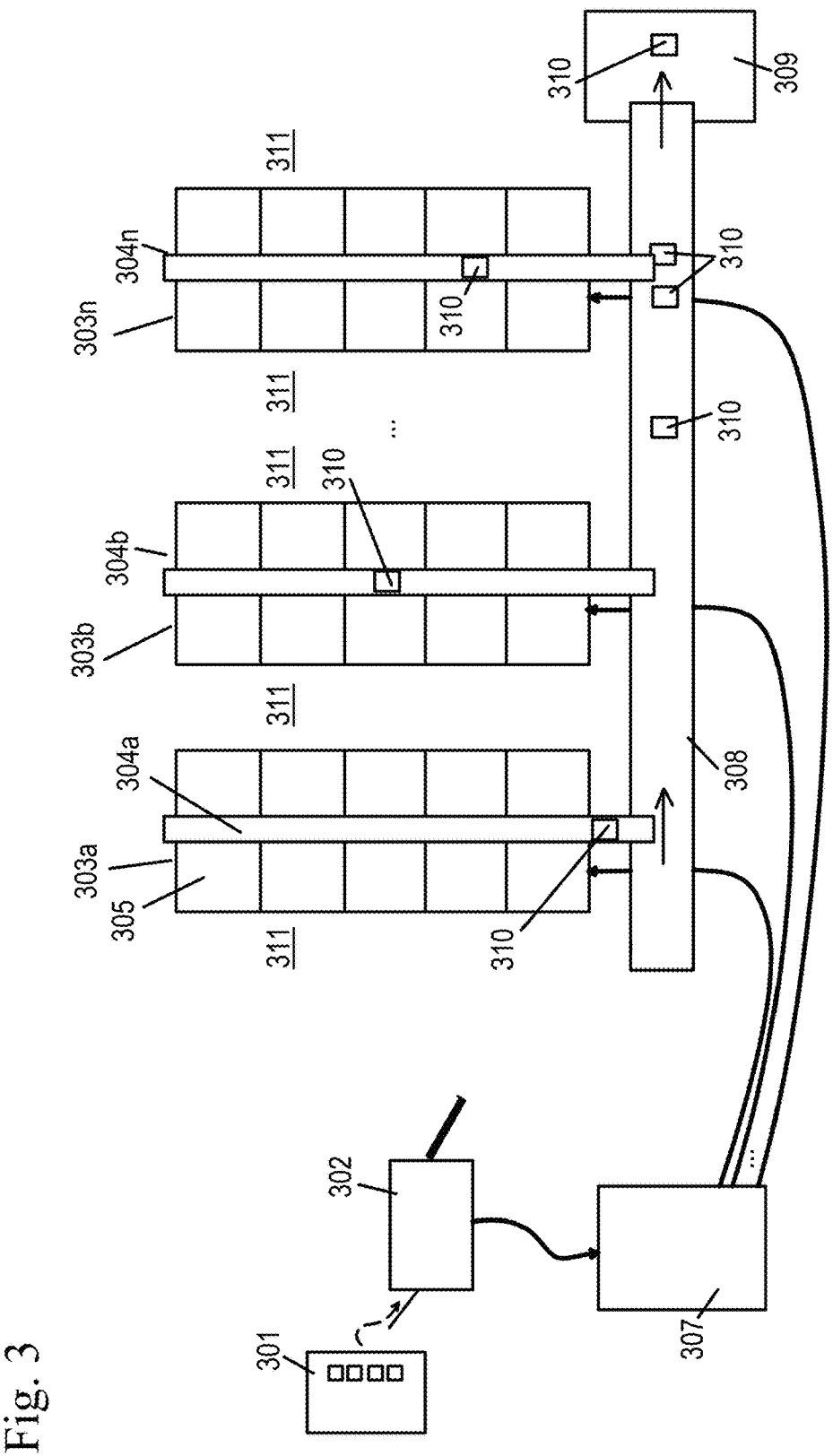
FIG. 3 shows an overall diagram of an order selection system.

The system can be used in a warehouse, shown in an example diagram of FIG. 3. It will be understood that the drawing in FIG. 3 is a simplified diagram provided solely to place the invention in context, and is not intended to limit the scope of the invention. The system is usable in many different arrangements and environments, as may be needed by the particular application to which it is applied.

In the example of FIG. 3, a number of storage banks 303a-303n are shown, separated by stocking aisles 311. Each bank 303a-303n has a plurality of cubical discharge modules 305, each cubical discharge module housing a plurality of cleated discharge belt conveyor modules, which will be shown and described in detail below. The conveyor modules of the discharge modules 305 dispense items 310 onto takeaway conveyors 304a-304n. It will be understood that the number and arrangement of takeaway conveyors 304a-304n will vary depending on the number and design of the storage banks 303a-303n.

The takeaway conveyors 304a-304n from each storage bank 303a-303n may lead directly to a pickup or packing area 309, or they could deposit items 310 onto one or more connecting belts 308, depending on the particular environment into which the system is installed.

Once the items 310 arrive at the pickup or packing area 308, they can be combined into larger packages or packed for shipping, as is known to the art.

The system begins by modifying the text in the form fields of quantity and location of an order selection form (pick ticket) to a standard 1D barcode font such as code 39 or an OCR character font. This is easily done in most, if not all, current order selection form (pick ticket) software packages.

An order selection form (pick ticket) is then printed in paper form 301 on a printer in a location near to the packaging zone of the order to be selected.

The order selection form (pick ticket) 301 is then introduced into a specifically designed Self Controlled Sheetfeed Optical Recognition Scanner 302 by a human operator. An operator may manage more than one Self Controlled Sheetfeed Optical Recognition Scanner at a time.

The Self Controlled Sheetfeed Optical Recognition Scanner 302 reads the quantity and location of the item or items to be selected by cycling the order selection form (pick ticket) 301 by means of a friction drive roller through an area in which resides a fixed but adjustable optical recognition scanner, as will be described below. The scanner reads the codes or characters and transmits ASCII information to a programmable logic controller (PLC) 307 residing within the Self Controlled Sheetfeed Optical Recognition Scanner 302 assembly.

The PLC 307 then performs two major functions within milliseconds of each other. It first stops the friction drive roller motor of the Self Controlled Sheetfeed Optical Recognition Scanner 302 for the length of time the discharge conveyors are expected to be in discharging mode, and secondly, it sends the appropriate information of quantity and location to a secondary "slave" PLC that resides in a control panel mounted within the discharge conveyor cubical or to a package/tote discharge conveyor control panel in the cubical discharge modules 305 of the storage banks 303a-303n.

The stoppage of the friction drive roller motor of the Self Controlled Sheetfeed Optical Recognition Scanner is important to insure that more than one discharge conveyor motor or the Self Controlled Sheetfeed Optical Recognition Scanner drive motor is not operating at the same time. By limiting the operation of multiple motors, this system addresses the concern of energy efficiency.

In an example of efficiency or minimal power consumption, a typical small parts discharge conveyor may use a low voltage (i.e. 12V) DC gear motor drawing less than 3 amps or 36 watts. A typical small parts conveyor may be set to discharge an item or part every 750 milliseconds or ¾ of a second. This would put the average rate of speed of the Self Controlled Sheetfeed Optical Recognition Scanner at 80 items per minute discharged from a discharge conveyor averaging 750 milliseconds per discharge. Multiplied by 60, that puts the operating range of a single Self Controlled Sheetfeed Optical Recognition Scanner at 60×80=4,800 items per hour. This is done with not more than one motor drawing less than 3 amps at 12 volts DC (36 watts) at a time.

The above example is a typical small parts discharge conveyor. Other discharge conveyors may be larger and require longer run times (reducing selective time rates) and more amperage consumption, but the concept is clearly the same. An example of a larger discharge conveyor would be a standard line shaft roller conveyor operating at 65 feet per minute (or 923 milliseconds per foot). Using a package or tote size of 2 feet in length the discharge time would be 1.846 seconds per item. 60 seconds divided by 1.846=32.5 items discharged per minute or 1,950 packages or totes per hour. In a typical warehouse or distribution application (e-commerce for example) a 2 foot long package is reaching the high end of typically shipped items. For larger items such as the package or tote application a 3 phase motor in the range of 460 volts could be used for the application. On a standard ¾ horsepower 460V 3 phase motor the current draw would be near the 1.4 amp range (or 644 watts).

The above examples are randomly picked sizes and possibilities of the system to address the issue of energy efficiency and may not apply in all scenarios. The type of discharge system will be product oriented and customer driven, designed specifically for each application based on speed of discharge requirements, available electrical power supply, and product weight.

If the items 310 requested are small parts, they may be discharged onto a conventional troughed slider bed belt conveyor 304a-304n, then 308 for conveyance to the appropriate packaging zone 309 or discharged to a chute or tilted tray or pan arrangement to be prepared for shipment or cycled to the next appropriate zone for combination with an item or items selected and delivered to that zone in the case of multiple zone orders.

If the items requested are boxed (package) or totes, or pallets, then standard conveyor appropriate for the item may be utilized to convey to a packaging or shipping area where applicable. Standard sortation methods including, but not limited to, barcode sortation may be utilized.

The Self Controlled Sheetfeed Optical Recognition Scanner 302 then restarts the drive motor and the cycle begins again until all parameter sets on the existing page are read, and all other pages in the Self Controlled Sheetfeed Optical Recognition Scanner assembly have been processed.

Operation of System Components

FIG. 1 shows a flowchart of the operation of the system of the invention.

Step 101: The form fields of item quantity and location on the order selection form (pick ticket) must be modified to an optically recognized font for use in the specifically designed Self Controlled Sheetfeed Optical Recognition Scanner. These fonts may be a 1D linear barcode font or an OCR readable character font. This is done primarily in the settings of fonts in the applicable program used to generate the order selection form (pick ticket).

Step 102: An order for selection is placed with the distributor/wholesaler, etc. who utilizes the Item-on-demand (I.O.D) system.

Step 103: An order selection form (pick ticket) is printed in a location of close proximity to the packing area where the discharged items are expected to arrive. The specifically designed Self Controlled Sheetfeed Optical Recognition Scanner is also located in close proximity to the pick ticket printer. This enables the pick ticket to be conveniently added to the physical item or items as they are prepared for packaging.

Step 104: The specifically designed Self Controlled Sheetfeed Optical Recognition Scanner operator feeds the pick ticket/s into the specifically designed Self Controlled Sheetfeed Optical Recognition Scanner face up in preparation for beginning the cycle of order selection/discharge.

Step 105: The Initiate (Start) button is pressed and the friction drive roller motor engages momentarily.

Step 106: The friction drive roller makes contact with the order selection form (pick ticket) and drives the form from the holding area in the infeed section to the read area in the discharge section. A paper photoelectric proximity sensor reads that there is a form present and continues supplying power to the friction drive roller motor via a relay in conjunction with the master PLC ladder logic.

Step 107: The optical recognition scanner in the read area then reads the first set of quantity and location as two separate instructions.

Step 108: The scanner then sends the information as ASCII information to the specifically designed Self Controlled Sheetfeed Optical Recognition Scanner Master PLC through a com port on the master PLC located in the specifically designed Self Controlled Sheetfeed Optical Recognition Scanner assembly.

Step 109: The master PLC receives the information from the scanner and reacts to the information by executing commands based on the ASCII information it has received.

Step 110: The master PLC program executes its ladder logic program based on the "equal to" or "not equal to" information received from the scanner.

Step 110a: One of the initial main functions of the master PLC ladder logic program is to disengage or "stop" the friction drive roller motor electrically for the expected duration of the item or items to be discharged (selected) from the discharge conveyors. This insures that the scanner will not read another set of parameters from the order selection form and engage another discharge conveyor. This is done to conserve available electrical power supplies and usage.

Step 110b: Another initial main function of the master PLC ladder logic program is to send information via hardwire or wireless communication through a com port to the slave PLC which resides in a discharge conveyor control panel. The information sent is specific to the location relays programmed into the slave PLC ladder logic program. There may be many multiples of discharge conveyor control panels with slave PLC's residing in the control panels.

Step 111: The slave PLC ladder logic program reacts to the information received from the master PLC.

Step 112: The slave PLC ladder logic program contains the information for the control relay triggers of the discharge conveyors.

Step 112a: The slave PLC executes a trigger signal to the appropriate discharge conveyor for a specified length of time based on the quantity of an item or items to be discharged. The speed of the discharge conveyors and the length (travel distance) of items to be discharged are known entities and easily programmed to suit application. Differences in electric motor performances are easily compensated for in this programming Step 113: The slave PLC completes its cycle and awaits instruction from the master PLC.

Step 113a: At this point, the item or items are already discharged from the discharge conveyor and available for conveyance to the packing area.

Step 114: The discharge conveyor is stopped by means of an integral signal switch either mechanical/electrical in the case of cleated belt discharge conveyors or photoelectric/proximity sensors in the case of package, tote, pallet or chain conveyor discharge conveyors.

Step 115: At this point, the expected duration of discharge has elapsed and the timers programmed into the ladder logic of the master PLC allow the friction drive roller motor to begin the cycle again, driving the next set of parameters on the order selection form into the scan/read area in the specifically designed Self Controlled Sheetfeed Optical Recognition Scanner.

Step 115a: The master PLC reads the next set of parameters and repeats the cycle as per starting point of "107" in this flow chart.

Step 116: The item or items discharged from the discharge conveyors are conveyed by means of standard conveyance appropriate to the discharge conveyors and products stored on the discharge conveyors. In the case of small parts, items may be conveyed to or directly delivered to a tilted pan, tray, or chute system designed for the specific application in the appropriate packing area. In the case of package, tote, or pallet conveyor, standard methods of stops, traffic cops metering belts, and sortation may be used for conveyance to the appropriate packing area. In the case of chain conveyor, appropriate transfers, pick ups and releases may be utilized for conveyance to the appropriate packing area. All methods of conveyance to the appropriate packing area are subject to the properties of the item or items to be conveyed and existing standard methods have been proven reliable and efficient in the material handling industry.

Step 116a. After standard conveyance from the discharge conveyors the item or items arrive in the predetermined packing area.

Step 116b: If the order is completed in this area (no further selections), the order is packed and sent to the shipping area via convenient means based on throughput, size, and other shipping considerations. This may mean standard conveyance, the use of multiple loaded totes, and/or palletization.

Step 116c: If the order is not complete, then the product is cycled to the next appropriate zone/s for completion of order. Again, the nature and properties of the product determine the method of conveyance to the next appropriate zone.

Self-Controlled Sheetfeed Optical Scanner

Figure 2:
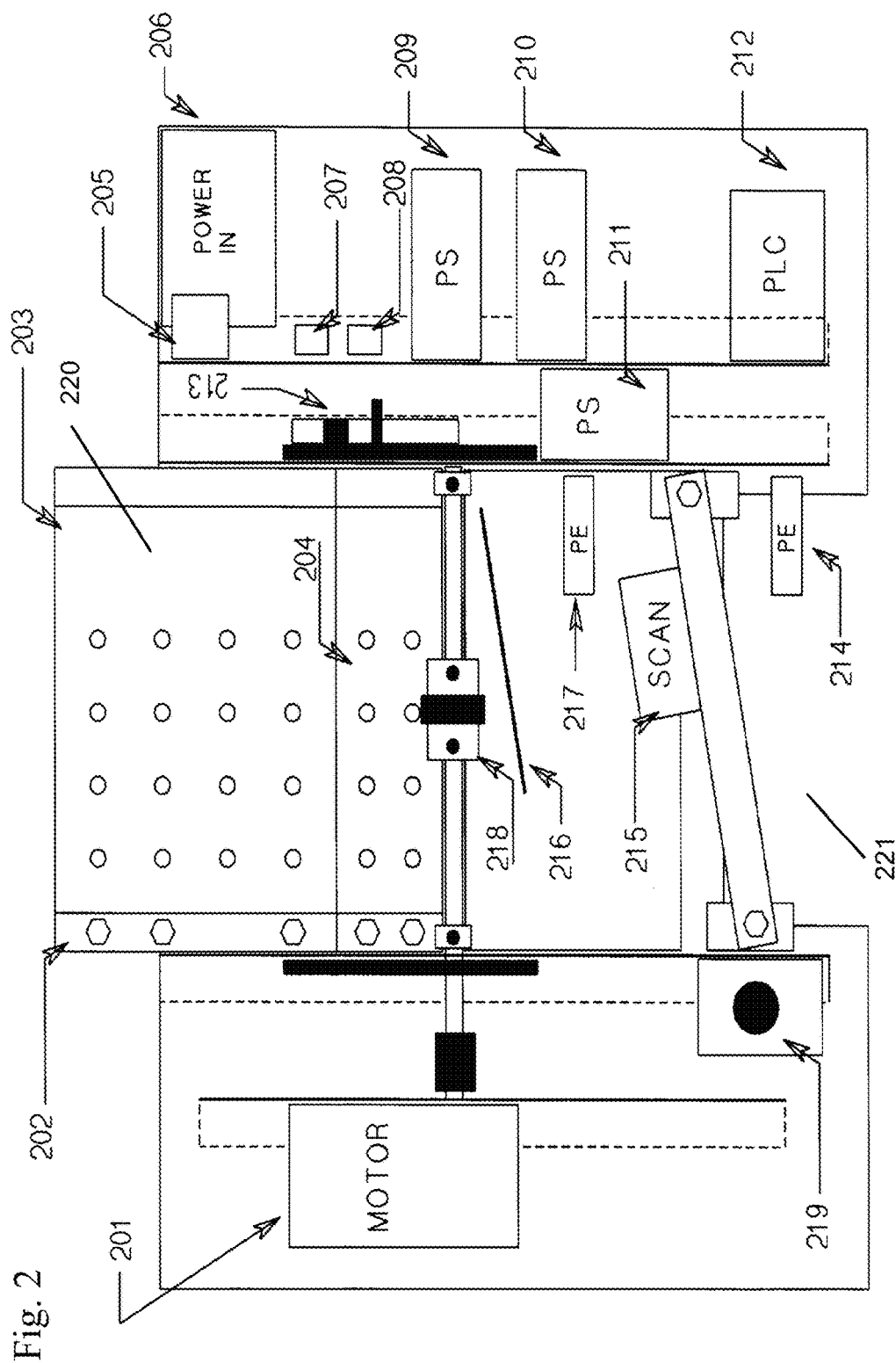
FIG. 2 shows a plan view of a self controlled sheetfeed optical scanner.
Figure 4:
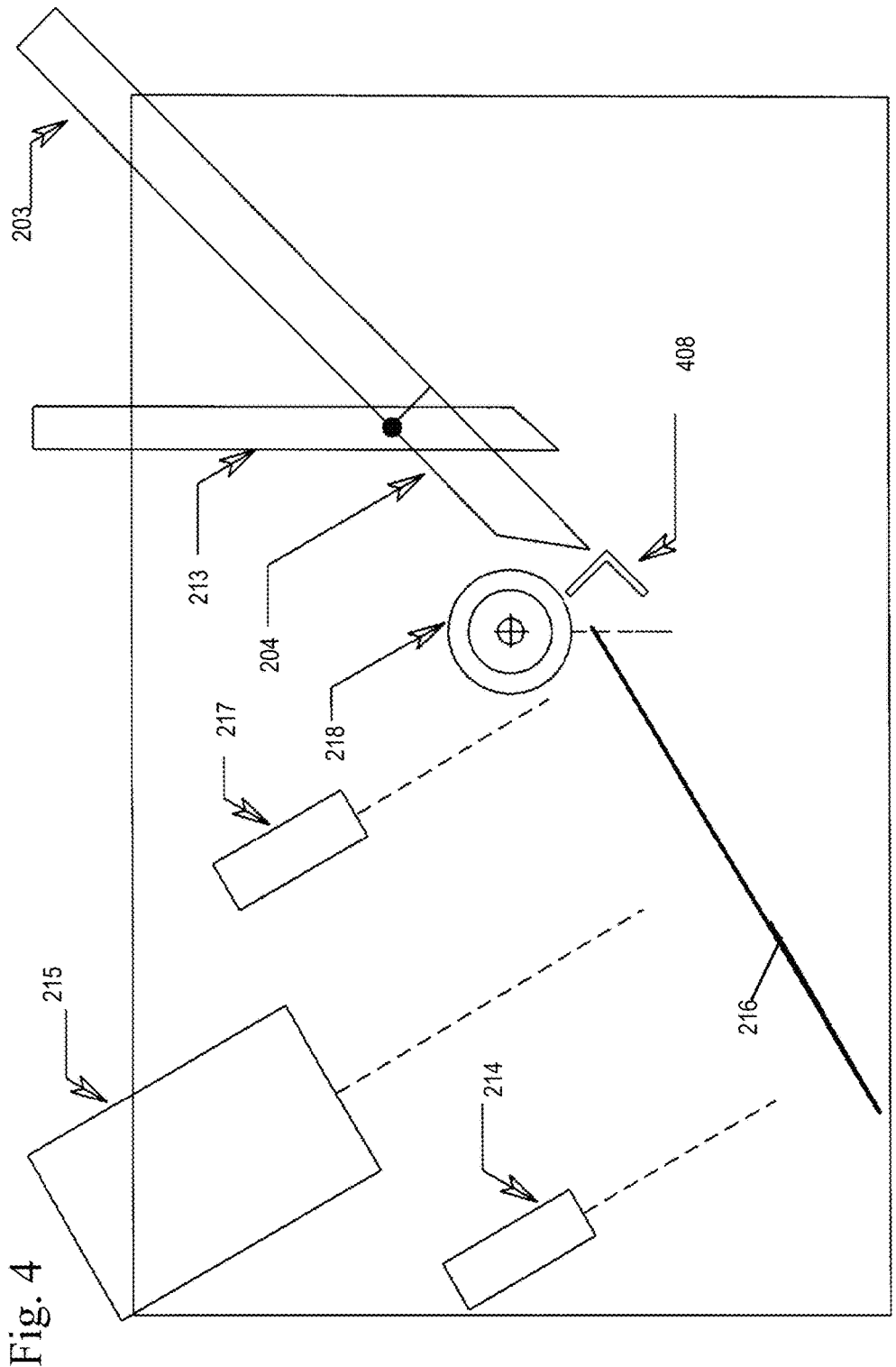
FIG. 4 shows a side view of the main components of a self controlled sheetfeed optical scanner.

FIG. 2 shows a plan view of a Self-Controlled Sheetfeed Optical Scanner of the system of the invention, and FIG. 4 shows a side view of the main components of the Self-Controlled Sheetfeed Optical Scanner of the invention.

Item 201 is a motor, preferably a low voltage, low amperage DC geared motor capable of at least 40 RPM, continuous duty, and able to drive the friction roller 218 suitable for cycling a sheet from the infeed section 203 into the read area 216 of the scanner. The paper infeed area 203 is supplied with adjustment holes for paper alignment.

An adjustable paper width guide 202 is provided in the infeed section 203 for alignment purposes of the order selection form as it enters the input side 220 of the infeed section 203. The infeed section 203 and guide 202 may be metal, plastic, or chemical composite in construction. A hinged location and portion 204 of the paper infeed area 203 is tensioned to provide introduction of the order selection form to the friction drive roller 218, which is an adjustable roller of metal, plastic, or chemical composite material with an attached sleeve of friction enhancing material such as latex, rubber, urethane, or other suitable chemical composite material. The roller 218 engages an order selection form and drives it through to the scanner read area 216. An infeed stop 408 can be provided to hold order selection form(s) in the infeed area 203 until they engage roller 218 and are moved on into the read area 216.

Relay 205 controls the power feed to the friction drive roller motor 201. Spring tensioned lever arm 213 is used for releasing an order selection form from friction drive roller 218 and engaging tension between the order selection form and drive roller 218.

When the drive roller 218 moves a form into the read area 216, it is read by Optical recognition scanner 215. The scanner 215 is of a type capable of reading the optical recognition indicia on the order form of the types which were chosen to be used in the system, as will be explained below.

Primary photoelectric/proximity sensor 217 senses sheet activity in the read area 216 to allow friction drive motor 218 to run if a page is in the reading area 216. Secondary photoelectric/proximity sensor 214 senses a page at the discharge end 221 of the read area 216, which gives additional control for multiple sheet feeds.

An Initiate (start) button 219 is provided to momentarily cycle the motor 201 to introduce the order selection form into the read area 216 where the primary photoelectric/proximity sensor 217 picks up the contact and supplies power to the friction drive roller motor 201, via a low voltage relay 205.

Power supply for the scanner is provided by the main power feed 206, which is typically at 110 VAC, through fuse 208. This supplies a power supply 209 for low voltage circuit which provides power for friction drive roller motor 201 and photoelectric/proximity sensors 214 and 217. The power supply 209 is preferably protected by a fuse 208. The other components of the scanner can be powered by power supply 209, or, as shown in the figure, by separate power supplies 210 for the Master Programmable Logic Controller (PLC) 212 and 211 for the scanner circuitry.

FIGS. 5a-5c show three examples of a linear scan read on a typical order selection form or pick ticket 501, as the form 501 passes through the scanner in the direction noted by arrow 510.

The blocks 502 on form 501 which are marked with "X" are optical recognition form fields, and these may be of any sort known to the art, for example bar codes (linear or two-dimensional), target codes, or optical character recognition (OCR) areas for printed or handwritten indicia. The line 503 marked "SR" shows the lineal scan read area.

The angle and height of read is adjustable on the scanner in the specifically designed Self Controlled Sheetfeed Optical Recognition Scanner assembly. Variations of font size, length of item location, and form field dimensions will determine the placement of the scan area reader.

Cleated Discharge Belt Conveyor Module

Figure 6A:
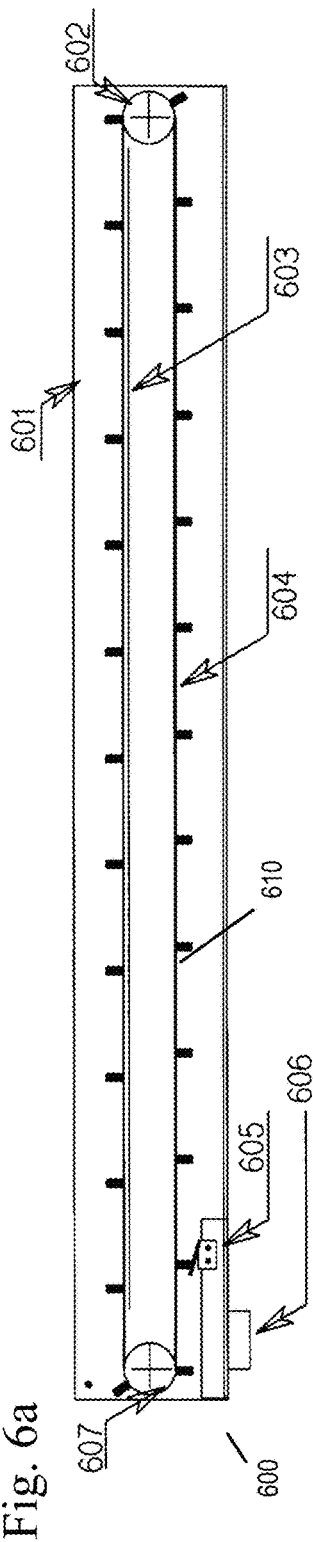
FIG. 6a shows a side view of a modular cleated discharge belt conveyor, without motor or takeup plate.
Figure 6B:
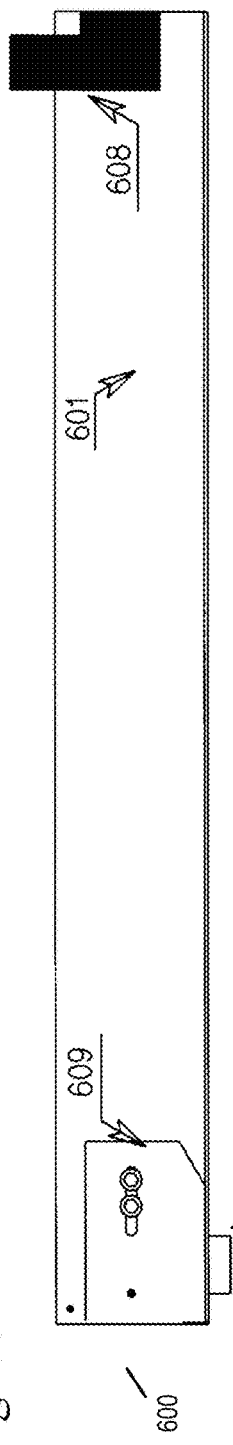
FIG. 6b shows a side view of a modular cleated discharge belt conveyor, with motor and takeup plate, but without limit switch or belt.
Figure 6C:
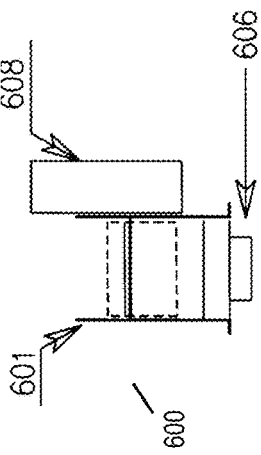
FIG. 6c shows an aisle side view of a modular cleated discharge belt conveyor.

FIGS. 6a-6c show various views of a Cleated Discharge Belt Conveyor Module 600 of the system of the invention. FIGS. 6a and 6b show the same view with the motor 608 and takeup plate 609 removed in FIG. 6a, and the limit switch 605 and belt 604 not shown in FIG. 6b. FIG. 6c shows an aisle side view of the side plate 601, motor 608 and discharge conveyor module plug 606.

A flexible belt 604 moves items or products from a load end of the module 600 to a discharge end. The belt 604 is preferably, as shown the figures, a cleated belt having cleats 610 spaced along its length, is usually made of limited stretch material such as polypropylene or canvas weave with synthetic or natural laminations. It is designed to provide equal lengths between cleats 610 for product orientation. It is typically spliced together using a metal hook and pin arrangement but may also be spliced using chemical bonding or heat bonding materials.

A limit switch 605 provides an indication of the position of the belt 604 by detecting the presence of the cleats 610 or items on the belt. The limit switch 605 could be implemented as a physical switch as shown in FIG. 6a which contacts the cleats 610, or a photoelectric sensor detecting an interruption of a light beam by an item or cleat 610, or a magnetic reed switch or Hall-effect sensor operated by magnets on the cleats 610, or an ultrasonic proximity detector, or other sensors known to the art. An explanation of operation of the limit switch 605 in the operation of the system is provided below with respect to the operating states shown in FIGS. 9a-9c.

Two side plates 601 form the vertical structural members of the cleated belt conveyor module 600. These may be of varying lengths and heights appropriately designed for specific product requirements. The horizontal structural member 603 referred to as a "slider bed" extends between the side plates 601. This structural member 603 supports the belt 604 as it is pulled to the discharge end of the conveyor 600. It also supports the weight of the product on the belt 604, reducing the amount of energy to move the product to the amount of sliding frictional force to overcome. Side plates 601 and structural member 603 may be manufactured from steel, alloy materials, plastic, or chemical composite materials.

Motor 608 is preferably a low voltage, low amperage DC motor sized as per application requirements. The motor 608 is fixed to the side plates 601. Main drive roller 602 is fixed to the drive motor 608 shaft and is utilized to create the pulling force on the belt 604. Take up pulley 607, mounted on take up plates 609, is adjustable to take the slack out of the belt. The main drive roller 602, take up pulley 607 and take up plate 609 can be manufactured from steel, alloy materials, plastic, or chemical composite materials.

Modular discharge conveyor module connector 606 connects the trigger feed, ground, and constant voltage feed of the discharge conveyor module 600 to a matching connector 809 on the cubical discharge module 702, as shown and discussed below in connection with FIGS. 7 and 8.

Figure 7:
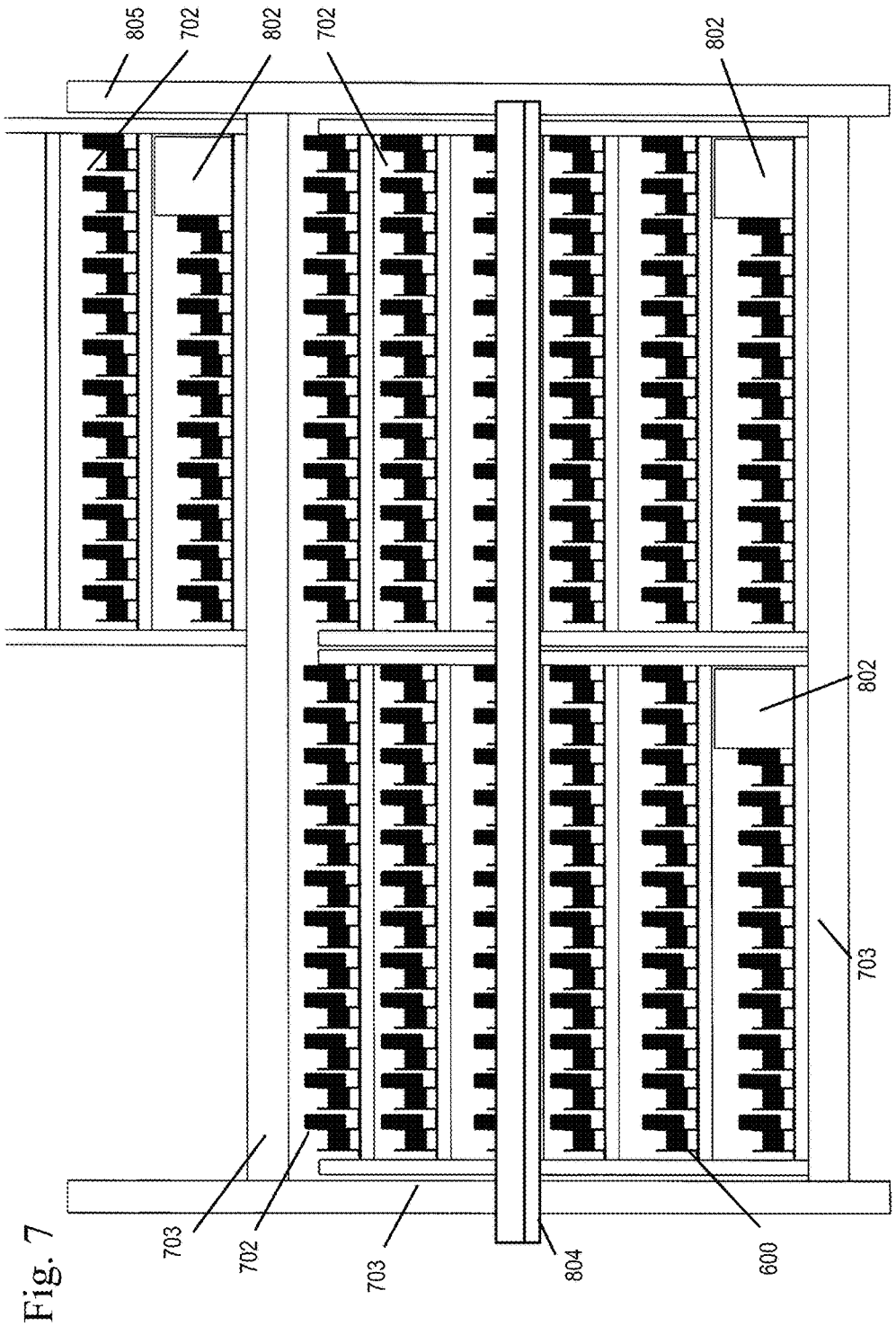
FIG. 7 shows an end view of a modular cubical of cleated belt discharge conveyors.

FIG. 7 shows the high density capabilities of the discharge conveyor modules 600 used in a cubical discharge module 702, shown from an end. FIG. 8 shows a side detail view of a portion of two cubical discharge modules 702 with six discharge conveyor modules 600. The structural support 703 for the cubical discharge module 702 is typically steel, such as pallet racking or a specifically engineered structure to suit application purposes.

The cubical discharge modules 702 may be designed using steel, alloy materials, plastic, or chemical composite materials as per the application requirement. Each cubical discharge module 702 will have a control panel 802 which houses the slave PLC and control relays for the discharge conveyor modules 600 in the cubical discharge module 702. In a very simple manner, an individual discharge conveyor module 600 can have its connector 606 disengaged from the matching connector 809 on the cubical discharge module 702 and removed for restocking of product between the cleats 610, then replaced.

A plurality of discharge conveyor modules 600 as described above are mounted in a support structure 805 in the form of a modular cubical framework which supports the discharge conveyor modules 600 and resides in the structural framework of a pallet rack or design engineered steelwork 703. Size and characteristics of the framework are designed as per application.

Each cubical discharge module 702 will have a control panel 802 which houses the slave PLC and control relays for the discharge conveyor modules 600 in the cubical discharge module 702.

Figure 8:
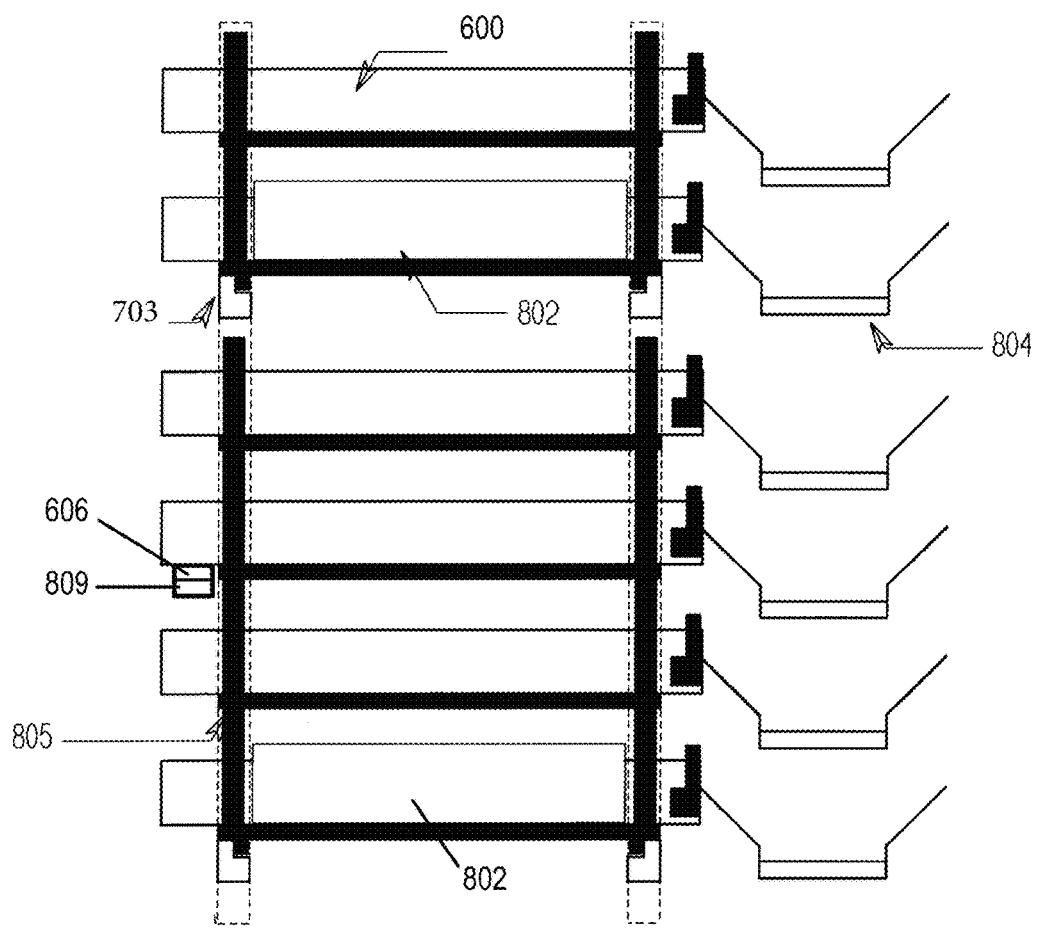
FIG. 8 shows a side view of a modular cubical of cleated belt discharge conveyors.

A takeaway conveyance 804, shown in FIG. 8 as a typical trough conveyor, moves items or products dispensed to a packing area. Application will determine size, quantity and type of conveyance 804.

Trigger Method for Operation of Discharge Conveyors

FIGS. 9a-9c show the three basic states of the discharge conveyor module 600 switch circuit. In each figure, power is supplied through a power input 901 through a limit switch 605. The output 902 of limit switch 605 is coupled to the motor or relay lead 905 which powers belt motor 608 and relay 903. It will be understood that the motor or relay lead 905 may power a motor 608 and relay 903 in parallel as shown in the figure, or it may power only one of the discharge motor 608 or relay 903 which can then power a larger type of discharge conveyor such as package, pallet, chain, etc. In another embodiment the power from the motor or relay lead 905 may be arranged to power the motor 608 and relay 903 sequentially to reduce available power requirements.

The limit switch 605 is operated by the belt cleats 610 on the belt 604 or, alternatively, by the presence of an item on the belt 604, arranged so that the switch 605 is open (does not supply power to the motor or relay lead 905 through switch output 902) when a cleat 610 or item is present in proximity to the switch 605, and the switch 605 is closed (supplies power to the motor or relay lead 905 through the switch output 902) when the switch 605 is in between cleats 610 or items.

A PLC trigger line 906 leading from the slave PLC in parallel with the limit switch 605 circuit, allows the PLC to close a switch 907 and power the motor 608 or relay 903, independent of the position of the limit switch 605.

The three basic states are as follows:

READY STATE: As shown in FIG. 9a, in this state the conveyor module 600 is inactive. The proximity of a cleat 610 or item holds the limit switch 605 in the open position, so that switch output 902 is unpowered. The PLC trigger line 906 is also unpowered, so that PLC trigger switch 907 is also open. With both switches 605 and 907 open, there is no power on the motor or relay lead 905 and motor 608 and relay 903 are unpowered, so that the belt 604 is stationary.

TRIGGER STATE: As shown in FIG. 9b, in the trigger state the PLC puts a trigger signal on the PLC trigger line 906, so that PLC trigger switch 907 closes. This supplies power to the motor or relay lead 905, which powers motor 608 and relay 903. The motor 608 causes belt 604 to move. The trigger signal needs to remain on the PLC trigger line 906 only long enough to move the belt 604 enough to move the cleat 610 or item away from the limit switch 605, so that limit switch 605 changes to the closed position, supplying power to switch output 902. This puts the system in operation state, see FIG. 9c, below.

OPERATION STATE: As shown in FIG. 9c, once the cleat 610 has moved away from the limit switch 605, the switch 605 is in the closed position, supplying power through the switch output 902 to the motor or relay lead 905, which keeps the motor 608 powered, even though trigger switch 907 has opened. The belt 604 continues to move until a cleat 610 or item arrives in proximity to the limit switch 605, which causes the switch 605 to open, and the system returns to the ready state, FIG. 9a, above.

As explained above, this allows the PLC to dispense a single item on the belt by momentarily triggering switch 907 just long enough for the system to enter operational state. The belt 604 moves just far enough to move the next cleat 610 or item to the limit switch 605, then stops. If it is desired to dispense more than one item, the PLC can simply repeat the process multiple times, triggering the system from ready state to trigger state to operational state and back to ready state as many times as needed.

Alternatively, more than one item can be dispensed in a continuous manner without starting and stopping the belt by prolonging the trigger state of FIG. 9b. The item quantity would be determined by the length of time the signal on the PLC trigger line 906 holds trigger switch 907 closed.

This can be accomplished by calculation, if the belt speed and the length of the product or distance between cleats are known values. In such an embodiment, the PLC would determine how long the belt would have to move until the belt length has passed the limit switch 605, then hold the trigger switch 907 closed for that length of time. The trigger switch 907 would then be opened, and the belt would continue to move in operational state until the next cleat or item causes the system to go back into ready state, as described above. The calculation of the required length of time the trigger signal needs to be held for a given quantity can be done as part of the determining process done by the PLC. Alternatively, a predetermined length of time can be pre-calculated and programmed into the PLC for each of the known quantities and locations of the individual discharge conveyor modules, so that the determining process is performed by using the quantity to look up the predetermined time.

For example, suppose it takes 750 milliseconds for the belt to move sufficiently to discharge a single item (or for the cleat arrangement to move one cleat), and suppose it takes at least 150 milliseconds for the belt to move enough to allow the system to switch from trigger state to operational state (that is, to move the belt enough so that the limit switch 605 takes over powering the motor 608 from the trigger switch 907). To dispense one item, the trigger signal would need to be at least 150 milliseconds duration—after that, the normal operation of the system will return to ready state after the single item is dispensed. To dispense two items, the trigger signal would need to be 150 milliseconds to start the belt, plus 600 milliseconds for remaining movement of the first item (at this time the system would normally return to ready state because a cleat or item opens the limit switch, but because the trigger signal is still closing the trigger switch the belt keeps on moving), plus 150 milliseconds more to keep the belt moving long enough to close the limit switch and start the operational state again to dispense the second package, for a total of 900 millisecond trigger signal duration. Further quantities utilize the same calculations for the trigger signal.

Alternatively, the PLC could have an input monitoring the state of the limit switch 605, so that if it were desired to dispense more than one item the PLC would raise a trigger signal to close the trigger switch 907 and cause the system to enter operational state, and then hold the trigger signal until the limit switch 605 has closed one fewer time than the number of items to be dispensed. Then the trigger signal can be lifted, and the system will remain in operational state long enough to dispense one more item, then re-enter ready state as normal.

Alternate Embodiment Using Linear Vertical/Horizontal Optical Scanner Assembly Detailed Description The Alternate Embodiment, shown in FIGS. 10-15, allows the use of the control logic software described in the application to operate the discharge conveyors also described in the application. It also allows the effectual zoning of order selection to be addressed by means of automatic cycling to various zones as needed for order completion. The variations of this device in use from the sheetfeed optical scanner are motor control circuits that allow the scanner to move linearly across a field of OCR characters or barcodes instead of moving the sheet (pick ticket) through a stationary field of scanning. All other aspects of control circuitry are particular to the automatic or semi-automatic design of the conveyor system as per the required application.

The Linear Vertical/Horizontal Optical Scanner Assembly is primarily a stationary conveyor, belt type with a linear optical scanner capable of reading 1D or OCR fonts, attached on the belt facing the expected tote/receptacle, which is to be the recipient of items selected. When introduced into the field of the scanner, the scanner communicates with the Master PLC as described above with respect to the sheetfeed scanner. A rotational motor is still used to move the linear belt with the attached scanner. An additional code or font at the end of the order ticket or label, which is common to all orders/labels in this application, instructs the scanner to communicate with the Master PLC to reverse the motor and return to an origin reading point to await a next cycle of reads.

The Linear Vertical/Horizontal Optical Scanner Assembly may be utilized in either the horizontal or vertical directions or variations thereof as specifically required by application due to sizes, weight, or any other variation of component selected.

The self-controlled horizontal/vertical optical scanner assembly utilizes the same basic logic control software as described above for use in selecting an order from the discharge conveyors. It enables the process to proceed to an automatic or semi-automatic level of order selection with minimal human intervention. The main difference between the sheetfeed optical scanner and the horizontal/vertical scanner is that the rotational motor for the sheetfeed scanner is replaced with a linear moving scanner.

The electrical efficiency and order/item selected rate efficiency is realized utilizing logic control software, and communicates with the discharge modules/conveyors in the same manner as described above. The horizontal/vertical choice of implementation is strictly for size variation and application requirements.

The self-controlled horizontal/vertical optical scanner assembly allows for an automatic procedure for orders/items to be selected in single or multiple zones without the need for human intervention and conveyed to desired location such as packing or shipping stations for processing.

Utilizing the self-controlled horizontal/vertical optical scanner assembly in a manner consistent with automatic labeling of the order selection form as described in this application will allow many multiple zones to be operating at any one given moment. For example: The rate of selection from the discharge conveyors of small items at an average rate of 0.75 s or 750 milliseconds may be multiplied out over the entire system based on the number of zones. As a small example, a distribution facility utilizing 20 zones of product would then have the capability of selecting 80 items per minute×20 zones=1,600 items per minute. Multiplied out× 60 minutes would result in a selection rate of (1,600×60) =96,000 items per hour. This far exceeds current capabilities of existing order selection systems.

At no time is there more than one motor operating in the discharge conveyors in an individual zone, for example, an average of 36 watts (12 v×3 amps) per zone×20 zones equals (36×20)=720 watts of continuous electrical energy for the selection of the items. Take away conveyors and peripheral electrical controls will add to electrical energy consumed, but no more than other systems utilizing take away conveyors. "Smart" DC controlled motors well known in the industry may also be used to help reduce energy consumption. Since the high rate of speed is selecting orders more quickly, the actual usage time of the takeaway conveyors and peripheral equipment will be reduced, thereby reducing overall consumption for running while not actually moving product. The example above is a very basic example of the process capabilities. Size of items selected will determine other actual selection rate speeds. This is one example of this application, the scope of the process is not limited to this single application.

High speed tote fill lines will reduce per item selection output times, as will cycling functions, conveyance to packing and shipping, along with the ability to actually process packing and shipping. In other words, there will be some reduction in items per hour, based on the ability to convey and process the actual orders. The order selection process itself should be configured with those factors in consideration as per application requirements.

With the very minimal usage of electrical energy used to select items, the more zones implemented in a system, the higher the selection output per hour of the system. A small reduction in rate will be realized in a manually applied order selection form application. End user application and requirements determine a preferred method.

Operation of a Process Containing the Linear Vertical/Horizontal Optical Scanner Assembly Initially the Order Process Software is instructed to print either an order selection form or a label which contains the order selection information in a 1D barcode or OCR font. Included in this information is a single or dual line item that contains the order number for future packing shipping references and also the "trigger" for an optical scanner to cycle the tote/receptacle from a main line conveyor to a zone accumulation conveyor. This circuit is independent of the Linear Vertical/Horizontal Optical Scanner Assembly circuitry.

In the case of a semi-automatic system, a paper order selection form or forms is printed and inserted manually into a location holder on the side of the tote/receptacle.

In the case of an automatic system, a label is created and applied to a tote/receptacle without human intervention by a label application device well known in the industry introduced via an accumulation conveyor means.

Once the tote/receptacle has been properly labeled or identified with an order select form it is introduced to the main line conveyor. This is done either manually in a semi-automatic system or automatically with an auto-label system.

The tote/receptacle advances on the conveyor line to the first zone. If a specific code or font is read by an independent scanner that indicates there is a selection to be made in that zone, the scanner triggers the "kick to" or push/divert function of a device to cycle the tote/receptacle to the zone accumulation line of that zone. If there is no selection in that zone, the tote/receptacle simply continues on to the next zone and all other zones after. Upon completion of all zone order selections, the tote/receptacle continues on to the pack/ship area for further processing, if needed.

Figure 14:
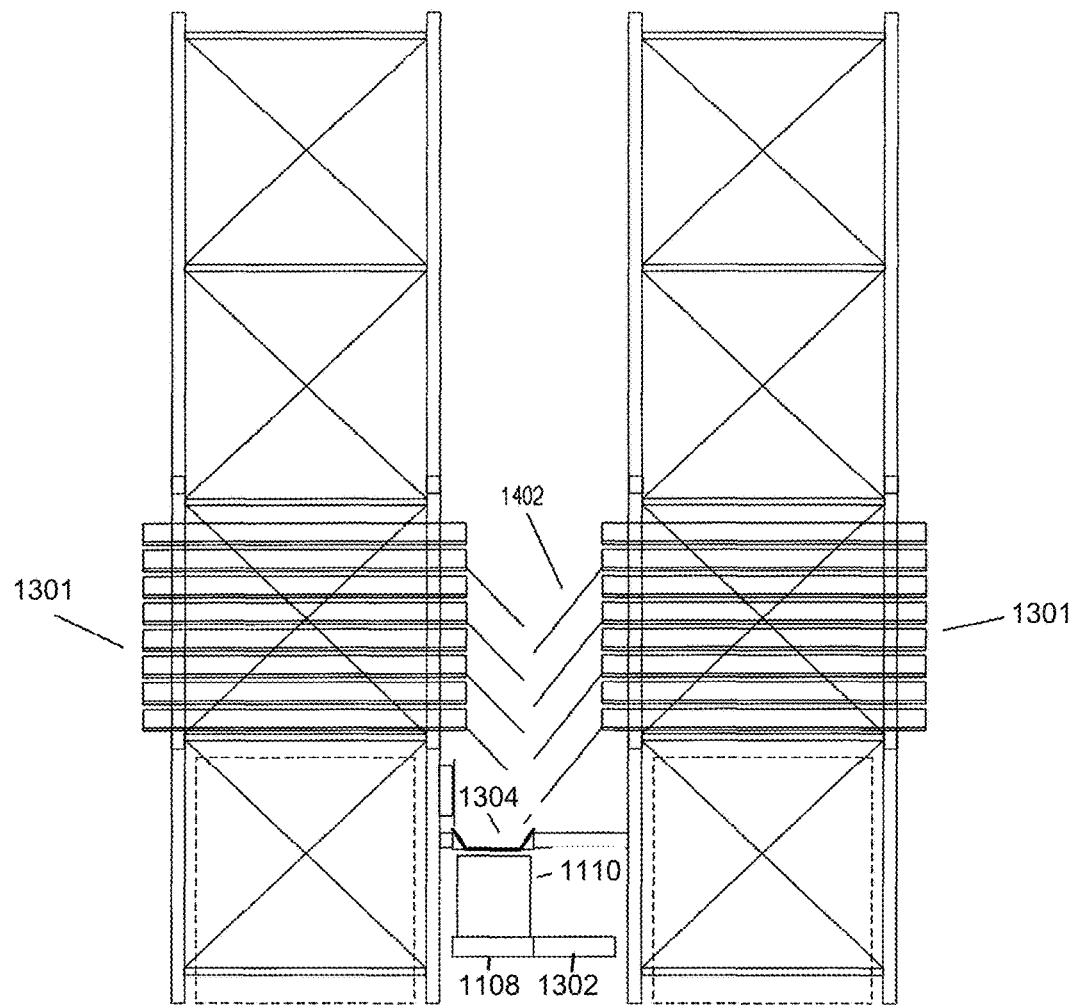
FIG. 14 shows an end view of a chute system.

If in fact there is a selection to be made in a particular zone, the tote/receptacle waits on the zone accumulation line and cycles down to the Linear Horizontal/Vertical Scanner read area where it is stopped by a mechanical package stop. Once situated in this area, a switch, either, photo eye, mechanical, or proximity, activates the cycle of the Linear Horizontal/Vertical Scanner. The scanner reads the information on the label or pick ticket in the same manner as the sheetfeed optical scanner, pausing between selections an appropriate time for the items selected. The items are discharged from the discharge conveyors to a high speed fill line which would typically be a trough type belt conveyor. The items discharged may be first introduced to a series of chutes or slides as shown in FIG. 14 to reduce the amount of zones and increase the cubic utilization of the system. The high speed fill line advances all the items selected for a period of time that the tote is present in the scanner read area. This is determined by the order selection form and is activated in tandem with the discharge conveyors.

Any items that do not reside in that zone are not selected. The Master PLC for that zone is only programmed to recognize codes or OCR fonts that reside in that zone.

Once all quantities and locations have been cycled to the awaiting tote/receptacle, the high speed fill line shuts off and the scanner reads the "end of order" code or font at the end of the order selection form or label. At this point, the tote/receptacle is "kicked from" or pushed/diverted from the read area back on to the main takeaway conveyor line. This is protected from interference with other totes on the main line by the use of a simple photo eye controlling stops or timers.

The end of order code is also utilized to cycle the scanner back to the origin point to await the next read cycle.

The next tote/receptacle on the zone accumulation line proceeds to the scanner read area and the cycle begins again.

After all zones have been satisfied and selected, the tote/receptacle continues on the main takeaway conveyor line to the packing/shipping area for further processing as required.

FIG. 10 is a step by step flow chart of the most prominent functions required for this application.

Step 2101: The form fields of item quantity and location on the order selection form (pick ticket) are modified to be an optically recognized font for use in the Self Controlled Sheetfeed Optical Recognition Scanner. These fonts may be a 1D linear barcode font or an OCR readable character font. This may be done primarily in the settings of fonts in the applicable program used to generate the order selection form (pick ticket).

Step 2102: An order for selection is placed with the distributor/wholesaler, etc. who utilizes the Item-on-demand (I.O.D) system.

Step 2103: The tote or receptacle is readied for conveyor introduction.

Step 2104: An order selection form (pick ticket) is printed in a location of close proximity to the packing area where the discharged items are expected to arrive.

Step 2105: The pick ticket is manually introduced into a holder on the tote or receptacle, or is applied to the tote or receptacle in the form of a label.

Step 2106: The tote or receptacle is introduced to the takeaway conveyor.

Step 2107: The first scanner on the takeaway conveyor adjacent to the intake end of a zone reads the order selection form on the tote or receptacle, and if the first scanner detects that the order selection form requires an item which is located in the zone, causes the tote or receptacle to be kicked onto the intake end of the zone conveyor of that zone.

Step 2108: The tote is advanced along the zone conveyor until it reaches the discharge end of the zone conveyor, where a zone switch detects that the tote or receptacle is present, and initiates an order scan of the pick ticket.

Step 2109: The second linear scanner drive motor initiates and begins scanning the pick ticket.

Step 2110: The second scanner then sends the information as ASCII information to the Master PLC through a com port on the master PLC.

Step 2111: The master PLC receives the information from the second scanner and reacts to the information by executing commands based on the ASCII information it has received.

Step 2112: The master PLC program executes its ladder logic program based on the "equal to" or "not equal to" information received from the scanner.

Step 2112a: Another initial main function of the master PLC ladder logic program is to send information via hardwire or wireless communication through a com port to the slave PLC which resides in a discharge conveyor control panel. The information sent is specific to the location relays programmed into the slave PLC ladder logic program. There may be many multiples of discharge conveyor control panels with slave PLC's residing in the control panels.

Step 2113: The slave PLC ladder logic program reacts to the information received from the master PLC.

Step 2114: The slave PLC ladder logic program contains the information for the control relay triggers of the discharge conveyors.

Step 2114a: The slave PLC executes a trigger signal to the appropriate discharge conveyor for a specified length of time based on the quantity of an item or items to be discharged. The speed of the discharge conveyors and the length (travel distance) of items to be discharged are known entities and easily programmed to suit application. Differences in electric motor performances are easily compensated for in this programming.

Step 2115: The slave PLC completes its cycle and awaits instruction from the master PLC.

Step 2115a: At this point, the item or items are already discharged from the discharge conveyor and dispensed into the tote at the discharge end of the zone conveyor.

Step 2116: The discharge conveyor is stopped by means of an integral signal switch either mechanical/electrical in the case of cleated belt discharge conveyors.

Step 2117: The second linear scanner returns to step 2109 and repeats the cycle as needed from step 2110 through 2115 in this flowchart until all items in that zone are selected.

Step 2118: The second linear scanner reads end of order for zone.

Step 2119: The second linear scanner recycles to origin position for next tote or receptacle. Step 2119a: Tote is kicked back to the takeaway conveyor and passed on to the next zone, if there is one.

Step 2120: After all zones are selected, the tote or receptacle is conveyed to the packing area via convenient means based on throughput, size, and other shipping considerations.

Figure 11:
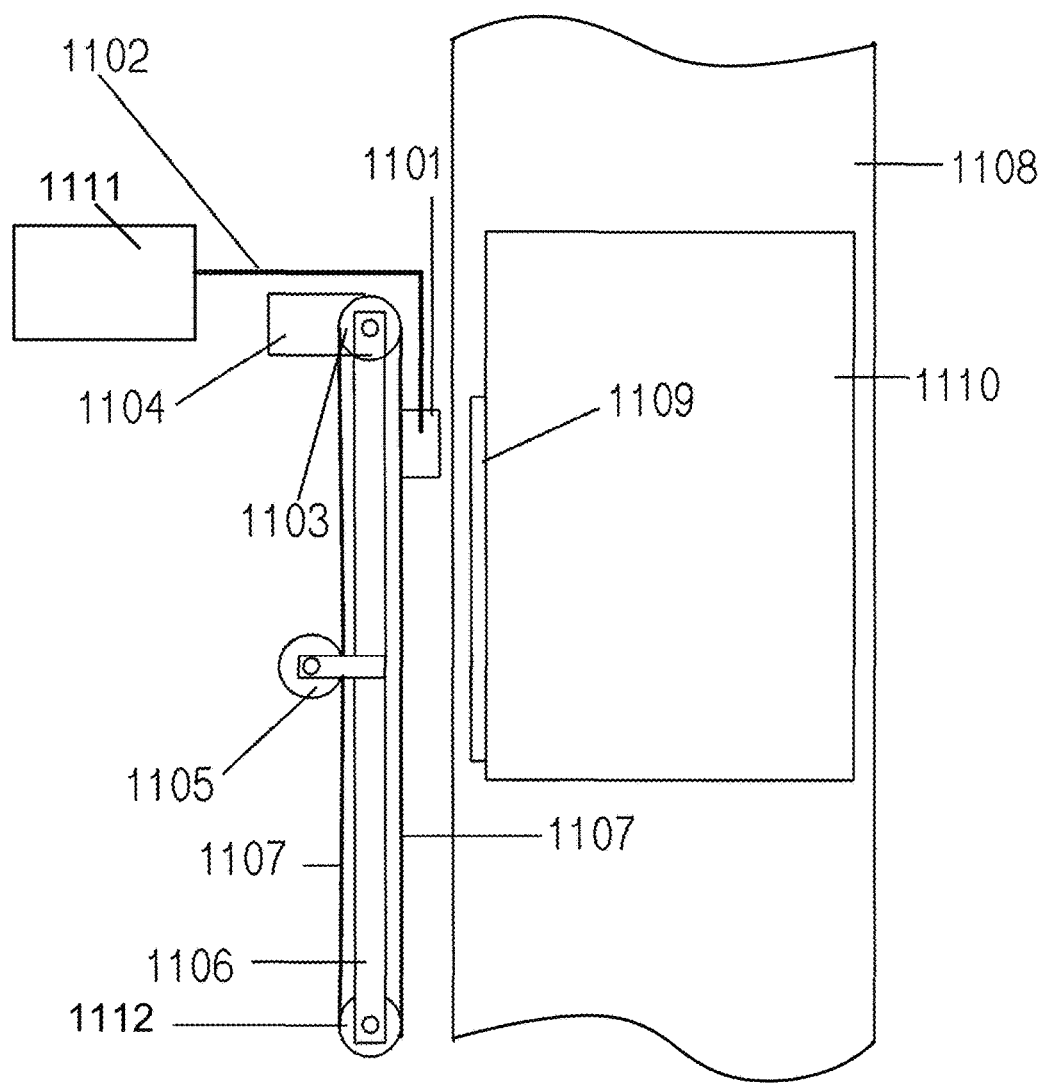
FIG. 11 shows a plan view of a horizontal application of a horizontal/vertical linear read scanner.

FIG. 11 shows the plan view of a horizontal application of the horizontal/vertical linear read scanner.

Item 1101 is a linear read scanner capable of reading 1D barcode or OCR character fonts, structure and sizing. Item 1101 is fixed to the assembly conveyor belt 1107 and moves in a linear direction dependent upon the program requirements, both forward and reverse, and is attached to the Master PLC of the Item on Demand order selection system by a flexible communications and power cord 1102 suitable for many cycles of operation of back and forth movements.

Item 1103 is the drive pulley of the linear scanner conveyor which is driven by gear motor 1104. This may be fabricated from metal alloys, steel, composite, or plastic materials and sized for speed and application. At the other end, belt 1107 runs over a non-driven pulley 1112.

Item 1104 is a low voltage, DC gear motor, (preferably operating in the 6 Volt to 36 Volt range) capable of forward and reverse functions. It is operated from the programming of the master PLC. The speed can specified as per application requirements.

Item 1105 is a simple belt tension device made up of a roller and a means to pull tension back on to the conveyor belt of the linear scanner assembly. This may be fabricated from metal alloys, steel, composite, or plastic materials and sized for speed per application requirements. The tensioning may be accomplished with a simple spring arrangement. The tension device allows for constant tension applied to the linear scanner assembly belt without the need for take-up pulley adjustment.

Item 1106 is a side frame (2 required) which is connected to its opposite member by a simple sheet of material or bolt arrangement. This may be fabricated from metal alloys, steel, composite, or plastic materials. It is the structural member of the linear scanner assembly and holds the components of the linear scanner assembly in place. It is supported by means determined by application in the Scan Read Area in close proximity to the fill line conveyor.

Item 1107 is a conveyor belt, suitable for flexible movement around small pulleys 1103 and 1112, which are preferably in the two-inch to three-inch diameter range. The belt 1107 can be manufactured from synthetic or natural fabrics or a mix of both. It may be spliced mechanically or by chemical or heat related methods.

Item 1108 is a zone conveyor which runs through each zone from an intake end and a discharge end, parallel to the takeaway conveyor 1302, which will be described below. The zone conveyors 1108 can be standard type accumulating roller conveyors sized and specified per application requirements.

Item 1109 is the area in which either an order selection form is placed or an automatic order read label is applied for the linear read scanner to retrieve information from to send to the Master PLC. For manual placement of an order selection form, a holder for constant location is required and may be manufactured from metal alloys, steel, composite, or plastic materials. In the case of an auto label application, a smooth sided tote or receptacle is preferred.

Tote or receptacle 1110 is an open-top container suitable as per the application for the receipt of parts from the high speed fill line conveyor. It rests on zone conveyor 1108 while receiving items selected from the discharge conveyor modules 1301. This may be fabricated from alloy, steel, composite, or plastic materials. It may be sized per application requirements.

FIGS. 12a-12c shows an example of a letter size order selection form or label 1203, which is similar in form to the examples in FIGS. 5a-5c. This form or label 1203 may be sized as required for application purposes. It may be inserted manually in the tote place holder 1109 (FIG. 11) or applied via an automatic label machine. The form or label 1203 contains the Order Number Code and Zone Select Code 1201 for the optical read scanner, needed for the kick/divert function of the main conveyor line. The form or label 1203 also contains the End of Select Code 1202 for the linear read scanner assembly to read and relay back to the Master PLC to tell the linear read scanner conveyor belt to return to origin for the next cycle. The form or label 1203 additionally contains order selection information 502 to relay to the Master PLC to select items from the modular discharge conveyors. Item 1204 is the direction of travel of the linear/horizontal vertical read scanner in the read mode.

Figure 13:
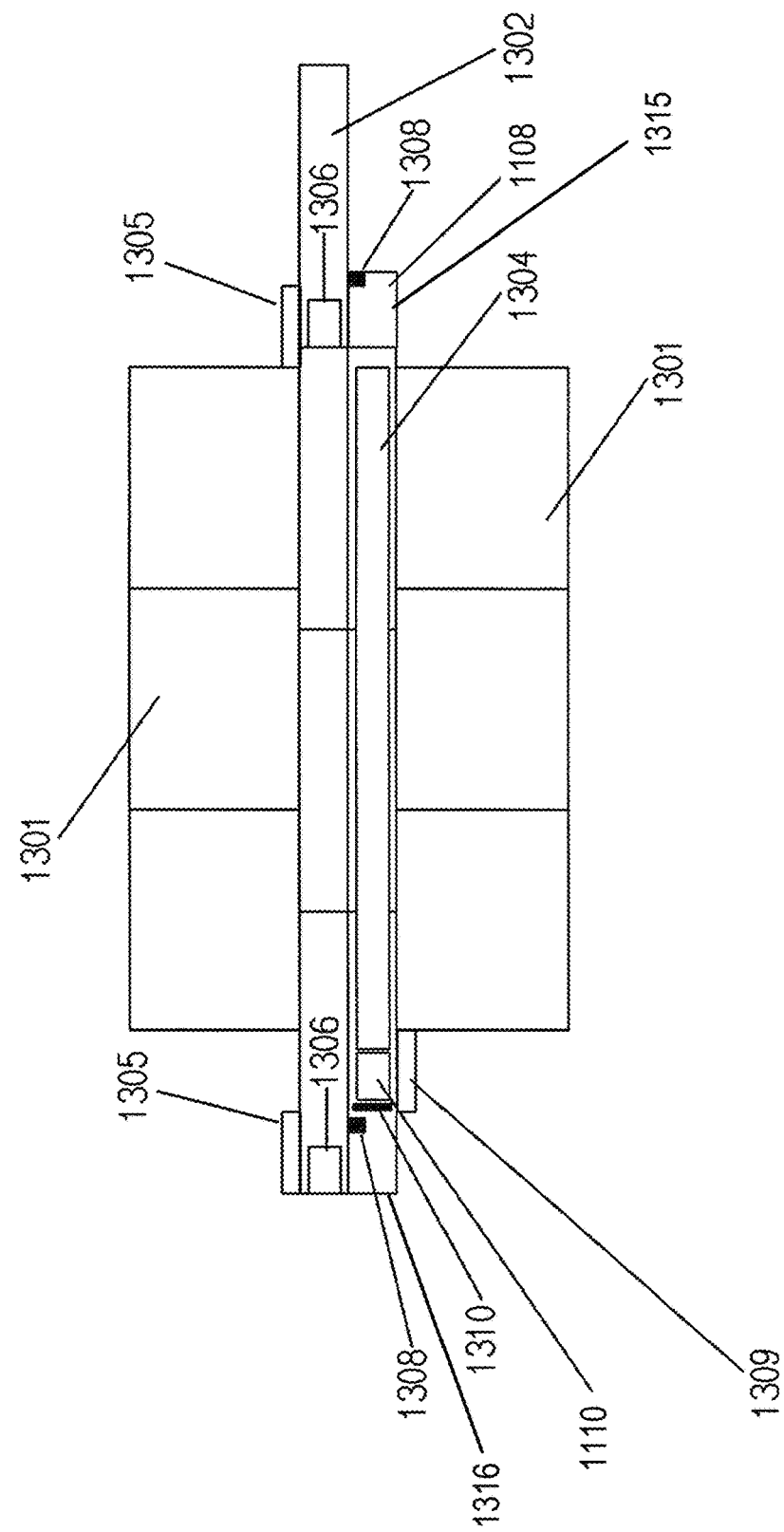
FIG. 13 shows a plan view of a zone.

FIG. 13 shows the components of a typical zoning application.

Items 1301 are the modular cubicle discharge conveyor modules which discharge items to a high speed fill line 1304.

Item 1302 is a takeaway conveyor which runs through all of the zones of the system. The takeaway conveyor 1302 can be a standard accumulating type roller conveyor, sized as per application and speed requirements. In this embodiment it is the main takeaway line.

Item 1108 is a zone conveyor used as the tote/receptacle accumulation line for orders to be selected as the tote/receptacle moves on the zone conveyor 1108 from its intake end 1315 to its discharge end 1316.

Item 1304 is a high speed fill line. It should be a trough type conveyor sized as per application and speed requirements. It receives the items selected as per the information on the order selection form or label and deposits them in the tote 1110.

Item 1305 is the "kick to" or "divert" actuator. In this area a signal is received from a code read from first optical scanner 1308. This code read determines if there is a selection in this zone, and if so the tote is either "kicked to" the accumulating fill line by the pusher 1305, or passes through the zone on the takeaway conveyor 1302 as a high speed diverter process.

Item 1306 is the tote/receptacle that contains the order selection information as previously described and is moving along the main takeaway conveyor line awaiting a signal to kick or divert to an appropriate zone for order selection. Application determines size and configuration of tote/receptacle.

Item 1110 is the tote/receptacle in process of being filled with items selected from the discharge conveyor modules 1301 via the high speed fill line 1304. It is in the Order Select Read Area 1309.

At the beginning of each zone is a linear read OCR scanner 1308, located adjacent to takeaway conveyor 1302 at the intake end 1315 of the zone conveyor 1108, that reads a predetermined code on the tote/receptacle 1306 and if the code is applicable to that zone 1305, initiates the pusher/sorter kicker or the high speed divert function of the process to move the tote from the takeaway conveyor 1302 to the zone conveyor 1108. Scanner 1308 is preferably an independent circuit not combined with the Master PLC.

Item 1309 is the Order Select Read Area at the discharge end 1316 of the zone conveyor 1108, and also the "Kick from"/"Divert to" to move totes from the zone conveyor 1108 back to the takeaway conveyor 1302 when the order is completed for the zone. It operates in conjunction with the Main PLC and receives the "trigger" signal from the last OCR code on the order selection form or label 1203. Once this is returned to the main takeaway conveyor line 1302, the next tote/receptacle behind will cycle to the conveyor stop 1310. Simple control configuration protects the tote from colliding with any tote on the main takeaway line. Photoelectric eyes (not shown) can be used to detect the clear area status, as is known to the art.

Item 1310 is a standard conveyor tote/receptacle stop that prevents the tote from advancing any further and positions the tote/receptacle in the scanner read area 1309 for order selection information.

FIG. 14 is an end view of an application utilizing a chute system to gain more available items via the discharge modules for processing in a zone.

Items 1301 are the modular cubical discharge conveyor modules sized as per application and speed requirement.

Items 1402 are the "herringbone chutes" that allow many more items to utilize the high speed fill line 1304. These may be manufactured from metal alloys, steel, composite, or plastic materials. These "chutes" or "slides" are sized as per application and desired drop rate of product. The number of structural attachments and their associated usage may vary per application requirements.

Item 1304 is the high speed fill line (trough conveyor) as previously described in the description of FIG. 13.

Item 1110 is the tote/receptacle accumulated on the tote/receptacle accumulation line 1308. Previous descriptions of the tote/receptacle are provided in the description of FIG. 11.

Item 1108 is the tote/receptacle accumulation line previously described in the description of FIG. 11.

Item 1302 is the main conveyor takeaway line for infeed of all totes/receptacles and takeaway for all totes/receptacles to pack/ship, as was previously described in the description of FIG. 13.

Figure 15:
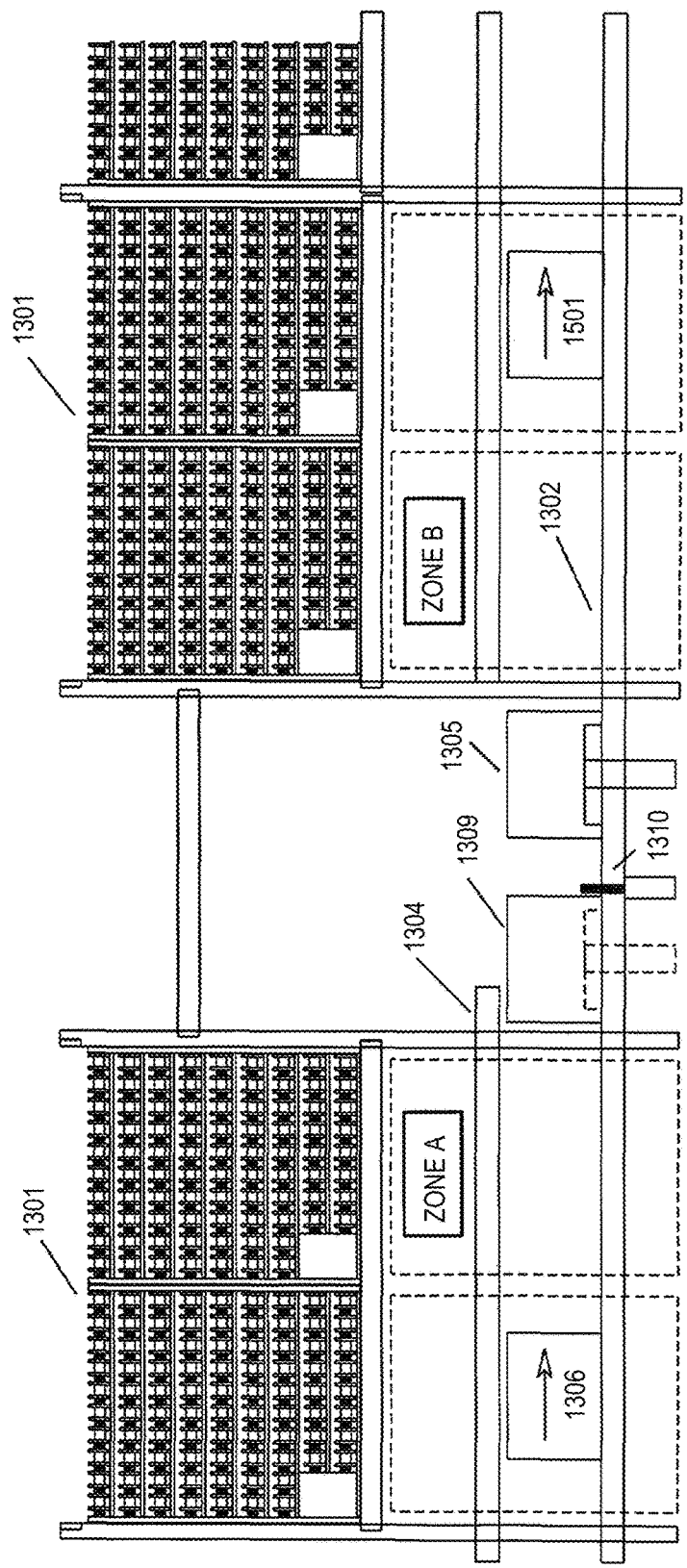
FIG. 15 shows a side view showing transition within multiple zones.

FIG. 15 is a side view showing the transition of the process within multiple zones. Chutes or slides are not shown on this figure for clearer representation.

Items 1301 are the cubicle modular discharge conveyors as previously described in the description of FIG. 13. These conveyors are sized as per application and speed requirements.

Item 1304 is the high speed fill line as previously described in the description of FIG. 13.

Item 1309 is the "kick from" the linear scanner read area as previously described in the description of FIG. 13.

Item 1305 is the "kick to" area as previously described in the description of FIG. 13.

Item 1302 is the Main Conveyor takeaway line as previously described in the description of FIG. 13.

Item 1306 is a tote/receptacle on main conveyor takeaway line prior to Zone B "kick to" area. In this scenario, the tote/receptacle has the bypassed Zone A "kick to" area. This is as previously described in the description of FIG. 13

Item 1501 is a tote/receptacle on main conveyor takeaway line prior to Zone C or some other Zone "kick to" area (not shown). The tote may have had an order selected in Zone A or Zone B and "kicked from" or may have bypassed Zone A or Zone B due to no selection required in Zone A or Zone B, as previously described in the description of FIG. 13.

Item 1310 is a standard physical mechanical package stop as previously described in the description of FIG. 13.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An item-on-demand dispensing system, comprising:
   a plurality of open-top totes;
   a takeaway conveyor having an intake end, a discharge end and a length for supporting the plurality of totes from the intake end to the discharge end;
   a plurality of zones arranged along the length of the takeaway conveyor, each zone comprising:
   a plurality of storage banks for storing and dispensing items, each storage bank comprising:
   a plurality of cubical discharge modules, each cubical discharge module comprising:
   a plurality of discharge conveyor modules for dispensing items, each discharge conveyor module having a roller conveyor or flexible belt conveyor for storing and moving a plurality of items between a load end and a discharge end of the roller or flexible belt conveyor, and a motor for driving the roller or flexible belt conveyor;

a zone conveyor having an intake end, a discharge end and a length running through the zone parallel to the takeaway conveyor and adjacent to the discharge end of the roller or flexible belt conveyor of the discharge conveyor modules, such that items discharged from the roller or flexible belt conveyors of the plurality of discharge conveyor modules are deposited into a tote located on the zone conveyor;

a first linear optical scanner located adjacent to the takeaway conveyor at the intake end of the zone conveyor, for scanning an order selection form located on a tote on the takeaway conveyor and reading indicia on the order selection form specifying a zone to be selected from;

an intake actuator adjacent to the intake end of the zone conveyor, for moving a tote from the takeaway conveyor to the zone conveyor if the first linear optical scanner read indicia on the order selection form on the tote which indicated that items to be dispensed were located in the zone;

a second linear optical scanner located adjacent to the discharge end of the zone conveyor, for scanning an order selection form located on a tote at the discharge end of the zone conveyor and reading indicia on the order selection form specifying items to be dispensed; and a discharge actuator adjacent to the discharge end of the zone conveyor, for moving a tote at the discharge end of the zone conveyor onto the takeaway conveyor;

a packing area for receiving items from the discharge end of the takeaway conveyor; and a controller coupled to the plurality of storage banks, the takeaway conveyor, the plurality of discharge actuators and the plurality of second linear optical scanners;

the controller being programmed such that when an order selection form on a tote located at the discharge end of a zone conveyor specifying an item to be dispensed from the zone is scanned by the second linear optical scanner for the zone, a discharge conveyor module in the zone containing the item is operated to dispense the item from the discharge end of the roller or flexible belt conveyor of the discharge conveyor module into the tote at the discharge end of the zone conveyor, and when all specified items from the zone have been dispensed into the tote, the second actuator is actuated by the controller to move the tote onto the takeaway conveyor.

2. The system of claim 1, in which the flexible belt conveyors of the discharge conveyors are cleated.

3. The system of claim 1, in which each of the plurality of storage banks further comprises at least one slave controller coupled to the discharge conveyor modules in the cubical discharge module, and the controller is coupled to the storage banks through the at least one slave controller of the storage bank.

4. The system of claim 3, in which the at least one slave controller comprises a slave controller in each of the cubical discharge modules of the storage bank.

5. A method of operating an item-on-demand dispensing system comprising a plurality of open-top totes; a takeaway conveyor having an intake end, a discharge end and a length for supporting the plurality of totes from the intake end to the discharge end; a plurality of zones arranged along the length of the takeaway conveyor, each zone comprising: a plurality of storage banks for storing and dispensing items, each storage bank comprising: a plurality of cubical discharge modules, each cubical discharge module comprising: a plurality of discharge conveyor modules for dispensing items, each discharge conveyor module having a roller conveyor or flexible belt conveyor for storing and moving a plurality of items between a load end and a discharge end of the roller or flexible belt conveyor, and a motor for driving the roller or flexible belt conveyor; a zone conveyor having an intake end, a discharge end and a length running through the zone parallel to the takeaway conveyor and adjacent to the discharge end of the roller or flexible belt conveyor of the discharge conveyor modules, such that items discharged from the roller or flexible belt conveyors of the plurality of discharge conveyor modules are deposited onto a high-speed fill line and then into a tote located on the zone conveyor; a first linear optical scanner located adjacent to the takeaway conveyor at the intake end of the zone conveyor, for scanning an order selection form located on a tote on the takeaway conveyor and reading indicia on the order selection form specifying a zone to select from; an intake actuator adjacent to the intake end of the zone conveyor, for moving a tote from the takeaway conveyor to the zone conveyor if the first linear optical scanner read indicia on the order selection form on the tote which indicated that items to be dispensed were located in the zone; a second linear optical scanner located adjacent to the discharge end of the zone conveyor, for scanning an order selection form located on a tote at the discharge end of the zone conveyor and reading indicia on the order selection form specifying items to be dispensed; and a discharge actuator adjacent to the discharge end of the zone conveyor, for moving a tote at the discharge end of the zone conveyor onto the takeaway conveyor; a packing area for receiving items from the discharge end of the takeaway conveyor; and a controller coupled to the plurality of storage banks, the takeaway conveyor, the plurality of discharge actuators and the plurality of second linear optical scanners; the method comprising the steps of:

a) receiving an order specifying at least one item for dispensing by the item-on-demand dispensing system;

b) printing an order selection form bearing optical recognition indicia specifying a zone, a quantity, a location for at least one item on the order which is to be dispensed by the item-on-demand dispensing system, and an end of order;

c) affixing the order selection form to the tote;

d) placing the tote on the takeaway conveyor;

e) a first scanner adjacent to the takeaway conveyor adjacent to an intake end of a zone reading the order selection form on the tote, and if the first scanner detects that the order selection form requires an item which is located in the zone, the first scanner activating the intake actuator for the zone to cause the tote to be kicked onto the intake end of the zone conveyor of the zone;

f) advancing the tote by the zone conveyor until the tote reaches the discharge end of the zone conveyor;

g) the second linear optical scanner for the zone reading the order selection form affixed to the tote and sending scanned information to a master controller;

h) the master controller operating a discharge conveyor module through a slave controller containing the at least one item to dispense the at least one item from the discharge end of the roller or flexible belt conveyor of the discharge conveyor module onto the high speed fill line, and then discharging into the tote;

i) if there are more items on the order selection form which are located in the zone, the master controller repeating step (h) until all items on the order selection form which are located in the zone have been dispensed; and j) the master controller activating the discharge actuator for the zone, moving the tote onto the takeaway conveyor.

6. The method of claim 5, in which step (c) of affixing the order selection form to the tote is performed by placing the order selection form into a holder on the tote.

7. The method of claim 5, in which step (c) of affixing the order selection form to the tote is performed by applying the order selection form to the tote in the form of a label.

8. The method of claim 5, in which each of the plurality of storage banks further comprises at least one slave controller coupled to the discharge conveyor modules in the cubical discharge module, and the master controller is coupled to the storage banks through the at least one slave controller of the storage bank, and step (h) of the slave controller operating the discharge conveyor module is performed by the master controller sending commands to the at least one slave controller.

9. The method of claim 8, in which the at least one slave controller comprises a slave controller in each of the cubical discharge modules of the storage bank.

10. The method of claim 5, in which the optical recognition indicia is selected from a group consisting of: machine-readable codes and optical character recognized text.

\* \* \* \* \*